United States Patent
Sarosi et al.

(10) Patent No.: US 10,965,727 B2
(45) Date of Patent: Mar. 30, 2021

(54) METHODS AND APPARATUS FOR PREMISES CONTENT DISTRIBUTION

(71) Applicant: TIME WARNER CABLE ENTERPRISES LLC, New York, NY (US)

(72) Inventors: George W. Sarosi, Charlotte, NC (US); Chris Cholas, Frederick, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 346 days.

(21) Appl. No.: 15/865,103

(22) Filed: Jan. 8, 2018

(65) Prior Publication Data

US 2018/0219931 A1 Aug. 2, 2018

Related U.S. Application Data

(63) Continuation of application No. 12/480,591, filed on Jun. 8, 2009, now Pat. No. 9,866,609.

(51) Int. Cl.
*H04L 29/06* (2006.01)

(52) U.S. Cl.
CPC ........ *H04L 65/605* (2013.01); *H04L 65/4084* (2013.01)

(58) Field of Classification Search
None
See application file for complete search history.

(56) References Cited

U.S. PATENT DOCUMENTS

| | | | |
|---|---|---|---|
| 4,521,881 A | 6/1985 | Stapleford et al. | |
| 4,546,382 A | 10/1985 | McKenna et al. | |
| 4,602,279 A | 7/1986 | Freeman | |
| 4,930,120 A | 5/1990 | Baxter et al. | |

(Continued)

FOREIGN PATENT DOCUMENTS

| CA | 2643806 C | 6/2013 |
|---|---|---|
| EP | 1139198 A2 | 10/2001 |

(Continued)

OTHER PUBLICATIONS

Wikipedia, Digital Video Recorder, obtained from the Internet Nov. 11, 2014.

(Continued)

*Primary Examiner* — Backhean Tiv
(74) *Attorney, Agent, or Firm* — Gazdzinski & Associates, PC

(57) ABSTRACT

Apparatus and methods for transfer and management of protected content in a network. In one embodiment, the apparatus comprises server and renderer devices including, for example, consumer premise equipment (CPE) having a content handler application adapted to run thereon. The content handler directs requests for content, directs searches of a device's storage, and directs transfers of content into the device as well as within the device. The content handler may, in another embodiment, be adapted to include a scheduler entity which maintains a schedule of upcoming content, and is adapted to maintain and manage requests for the upcoming content by reserving tuner resources. The content handler may be further adapted to implement authentication and authorization procedures.

20 Claims, 18 Drawing Sheets

(56) References Cited

U.S. PATENT DOCUMENTS

| | | | |
|---|---|---|---|
| 5,155,591 A | 10/1992 | Wachob |
| 5,233,423 A | 8/1993 | Jernigan et al. |
| 5,313,454 A | 5/1994 | Bustini et al. |
| 5,361,091 A | 11/1994 | Hoarty et al. |
| 5,369,707 A | 11/1994 | Follendore, III |
| 5,528,284 A | 6/1996 | Iwami et al. |
| 5,577,209 A | 11/1996 | Boyle et al. |
| 5,600,364 A | 2/1997 | Hendricks et al. |
| RE35,651 E | 11/1997 | Bradley et al. |
| 5,708,961 A | 1/1998 | Hylton et al. |
| 5,715,403 A | 2/1998 | Stefik |
| 5,734,380 A | 3/1998 | Adams et al. |
| 5,758,257 A | 5/1998 | Herz et al. |
| 5,774,170 A | 6/1998 | Hite et al. |
| 5,787,172 A | 7/1998 | Arnold |
| 5,793,410 A | 8/1998 | Rao |
| 5,815,662 A | 9/1998 | Ong |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,886,995 A | 3/1999 | Arsenault et al. |
| 5,897,635 A | 4/1999 | Torres et al. |
| 5,914,945 A | 6/1999 | Abu-Amara et al. |
| 5,926,205 A | 7/1999 | Krause et al. |
| 5,935,206 A | 8/1999 | Dixon et al. |
| 5,963,844 A | 10/1999 | Dail |
| 5,982,412 A | 11/1999 | Nulty |
| 6,002,393 A | 12/1999 | Hite et al. |
| 6,009,103 A | 12/1999 | Woundy |
| 6,047,327 A | 4/2000 | Tso et al. |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,377 A | 12/2000 | Shah-Nazaroff et al. |
| 6,157,719 A | 12/2000 | Wasilewski et al. |
| 6,161,142 A | 12/2000 | Wolfe et al. |
| 6,167,432 A | 12/2000 | Jiang |
| 6,167,521 A | 12/2000 | Smith et al. |
| 6,169,728 B1 | 1/2001 | Perreault et al. |
| 6,175,856 B1 | 1/2001 | Riddle |
| 6,181,697 B1 | 1/2001 | Nurenberg et al. |
| 6,182,050 B1 | 1/2001 | Ballard |
| 6,211,869 B1 | 4/2001 | Loveman et al. |
| 6,211,901 B1 | 4/2001 | Imajima et al. |
| 6,212,636 B1 | 4/2001 | Boyle et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,243 B1 | 5/2001 | Chen et al. |
| 6,240,553 B1 | 5/2001 | Son et al. |
| 6,252,964 B1 * | 6/2001 | Wasilewski ......... H04L 63/0823 380/282 |
| 6,256,393 B1 * | 7/2001 | Safadi .................. G06F 21/10 380/211 |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,456,716 B1 | 9/2002 | Arnold |
| 6,463,508 B1 | 10/2002 | Wolf et al. |
| 6,463,585 B1 | 10/2002 | Hendricks et al. |
| 6,487,721 B1 | 11/2002 | Safadi |
| 6,498,783 B1 | 12/2002 | Lin |
| 6,502,139 B1 | 12/2002 | Birk et al. |
| 6,516,412 B2 | 2/2003 | Wasilewski et al. |
| 6,519,062 B1 | 2/2003 | Yoo |
| 6,523,696 B1 | 2/2003 | Saito et al. |
| 6,560,578 B2 | 5/2003 | Eldering |
| 6,590,865 B1 | 7/2003 | Ibaraki et al. |
| 6,594,699 B1 * | 7/2003 | Sahai ................ H04L 29/06027 709/228 |
| 6,601,171 B1 | 7/2003 | Carter et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,640,145 B2 | 10/2003 | Hoffberg et al. |
| 6,651,103 B1 | 11/2003 | Markowitz et al. |
| 6,657,991 B1 | 12/2003 | Akgun et al. |
| 6,671,736 B2 | 12/2003 | Virine et al. |
| 6,687,735 B1 | 2/2004 | Logston et al. |
| 6,694,145 B2 | 2/2004 | Riikonen et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,116 B1 | 5/2004 | Matsui et al. |
| 6,742,187 B1 | 5/2004 | Vogel |
| 6,745,245 B1 * | 6/2004 | Carpenter ............... G06F 21/10 380/239 |
| 6,760,768 B2 | 7/2004 | Holden et al. |
| 6,763,391 B1 | 7/2004 | Ludtke |
| 6,771,290 B1 | 8/2004 | Hoyle |
| 6,772,435 B1 * | 8/2004 | Thexton .................. H04N 7/16 348/E7.054 |
| 6,775,843 B1 | 8/2004 | McDermott |
| 6,782,475 B1 | 8/2004 | Sumner |
| 6,782,550 B1 | 8/2004 | Cao |
| 6,785,810 B1 | 8/2004 | Lirov et al. |
| 6,788,676 B2 | 9/2004 | Partanen et al. |
| 6,799,196 B1 | 9/2004 | Smith |
| 6,807,573 B2 | 10/2004 | Saito et al. |
| 6,813,505 B2 | 11/2004 | Walley et al. |
| 6,839,757 B1 * | 1/2005 | Romano ................ H04L 67/16 709/226 |
| 6,842,783 B1 | 1/2005 | Boivie et al. |
| 6,859,535 B1 | 2/2005 | Tatebayashi et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,708 B2 | 5/2005 | Hori et al. |
| 6,898,800 B2 | 5/2005 | Son et al. |
| 6,910,064 B1 | 6/2005 | Astarabadi et al. |
| 6,917,628 B2 | 7/2005 | McKinnin et al. |
| 6,925,257 B2 | 8/2005 | Yoo |
| 6,944,150 B1 | 9/2005 | McConnell et al. |
| 6,944,166 B1 | 9/2005 | Perinpanathan |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,961,430 B1 | 11/2005 | Gaske et al. |
| 6,973,576 B2 | 12/2005 | Giobbi |
| 6,975,730 B1 | 12/2005 | Kuroiwa et al. |
| 6,977,691 B1 | 12/2005 | Middleton et al. |
| 6,981,045 B1 | 12/2005 | Brooks |
| 6,985,355 B2 | 1/2006 | Allirot |
| 6,985,934 B1 | 1/2006 | Armstrong et al. |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,010,801 B1 | 3/2006 | Jerding et al. |
| 7,016,963 B1 | 3/2006 | Judd et al. |
| 7,017,174 B1 | 3/2006 | Sheedy |
| 7,017,189 B1 | 3/2006 | Demello et al. |

(56) References Cited

U.S. PATENT DOCUMENTS

| | | | |
|---|---|---|---|
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,048 B1 | 5/2006 | Monta et al. |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,058,387 B2 | 6/2006 | Kumar et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,069,578 B1 | 6/2006 | Prus et al. |
| 7,072,950 B2 | 7/2006 | Toft |
| 7,073,189 B2 | 7/2006 | McElhatten et al. |
| 7,073,199 B1 | 7/2006 | Raley |
| 7,075,945 B2 | 7/2006 | Arsenault et al. |
| 7,085,839 B1 | 8/2006 | Baugher et al. |
| 7,086,077 B2 | 8/2006 | Giammaressi |
| 7,088,910 B2* | 8/2006 | Potrebic ............ G11B 27/036 |
| | | | 386/291 |
| 7,089,577 B1 | 8/2006 | Rakib et al. |
| 7,092,397 B1 | 8/2006 | Chandran et al. |
| 7,093,272 B1 | 8/2006 | Shah-Nazaroff et al. |
| 7,099,308 B2 | 8/2006 | Merrill et al. |
| 7,100,183 B2 | 8/2006 | Kunkel et al. |
| 7,103,181 B2 | 9/2006 | Ananth |
| 7,103,906 B1 | 9/2006 | Katz et al. |
| 7,106,382 B2 | 9/2006 | Shiotsu |
| 7,107,326 B1 | 9/2006 | Fijolek et al. |
| 7,107,462 B2 | 9/2006 | Fransdonk |
| 7,110,457 B1 | 9/2006 | Chen et al. |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,149,772 B1 | 12/2006 | Kalavade |
| 7,152,237 B2 | 12/2006 | Flickinger et al. |
| 7,154,912 B2 | 12/2006 | Chong et al. |
| 7,155,508 B2 | 12/2006 | Sankuratripati et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2* | 2/2007 | Li ................ H04L 65/4084 |
| | | | 709/228 |
| 7,178,161 B1 | 2/2007 | Fristoe et al. |
| 7,181,010 B2 | 2/2007 | Russ et al. |
| 7,181,760 B1 | 2/2007 | Wallace |
| 7,191,461 B1 | 3/2007 | Arsenault et al. |
| 7,194,752 B1 | 3/2007 | Kenyon et al. |
| 7,194,756 B2 | 3/2007 | Addington et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,209,458 B2 | 4/2007 | Ahvonen et al. |
| 7,216,265 B2 | 5/2007 | Hughes et al. |
| 7,225,164 B1 | 5/2007 | Candelore et al. |
| 7,225,333 B2 | 5/2007 | Peinado et al. |
| 7,225,458 B2 | 5/2007 | Klauss et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,237,250 B2 | 6/2007 | Kanojia et al. |
| 7,242,960 B2 | 7/2007 | Van et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,257,650 B2 | 8/2007 | Maciesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,283,782 B2 | 10/2007 | Sinnarajah et al. |
| 7,289,534 B1 | 10/2007 | Bailey et al. |
| 7,296,074 B2 | 11/2007 | Jagels |
| 7,299,290 B2 | 11/2007 | Karpoff |
| 7,299,502 B2 | 11/2007 | Schmeling et al. |
| 7,305,460 B2 | 12/2007 | Park |
| 7,305,691 B2 | 12/2007 | Cristofalo |
| 7,308,415 B2 | 12/2007 | Kimbrel et al. |
| 7,313,611 B1 | 12/2007 | Jacobs et al. |
| 7,317,728 B2 | 1/2008 | Acharya et al. |
| 7,320,134 B1 | 1/2008 | Tomsen et al. |
| 7,324,531 B2 | 1/2008 | Cho |
| 7,325,073 B2 | 1/2008 | Shao et al. |
| 7,327,692 B2 | 2/2008 | Ain et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,343,614 B1* | 3/2008 | Hendricks .......... H04N 7/17318 |
| | | | 348/E7.071 |
| 7,346,688 B2 | 3/2008 | Allen et al. |
| 7,346,917 B2* | 3/2008 | Gatto ............... H04N 21/42222 |
| | | | 725/5 |
| 7,352,775 B2 | 4/2008 | Powell |
| 7,353,543 B2 | 4/2008 | Ohmori et al. |
| 7,355,980 B2 | 4/2008 | Bauer et al. |
| 7,356,246 B1* | 4/2008 | Kobb ..................... H04N 5/76 |
| | | | 386/291 |
| 7,363,371 B2 | 4/2008 | Kirkby et al. |
| 7,370,120 B2 | 5/2008 | Kirsch et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,397,825 B2 | 7/2008 | Woodward et al. |
| 7,403,618 B2 | 7/2008 | Van et al. |
| 7,409,546 B2 | 8/2008 | Platt |
| 7,434,245 B1 | 10/2008 | Shiga et al. |
| 7,457,520 B2 | 11/2008 | Rosetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,555,006 B2 | 6/2009 | Wolfe et al. |
| 7,567,565 B2 | 7/2009 | La |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,617,516 B2 | 11/2009 | Huslak et al. |
| 7,630,401 B2 | 12/2009 | Iwamura |
| 7,673,004 B1 | 3/2010 | Sherstinsky et al. |
| 7,689,995 B1* | 3/2010 | Francis ............ H04N 21/47214 |
| | | | 718/104 |
| 7,690,020 B2 | 3/2010 | Lebar |
| 7,693,171 B2 | 4/2010 | Gould |
| 7,707,644 B2 | 4/2010 | Choi et al. |
| 7,720,986 B2 | 5/2010 | Savoor et al. |
| 7,721,313 B2* | 5/2010 | Barrett ............... H04N 21/4333 |
| | | | 725/89 |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,757,251 B2 | 7/2010 | Gonder et al. |
| 7,763,360 B2 | 7/2010 | Paul et al. |
| 7,779,097 B2 | 8/2010 | Lamkin et al. |
| 7,783,316 B1 | 8/2010 | Mitchell |
| 7,783,891 B2 | 8/2010 | Perlin et al. |
| 7,805,052 B2 | 9/2010 | Nakamura et al. |
| 7,805,741 B2 | 9/2010 | Yeh |
| 7,809,942 B2 | 10/2010 | Baran et al. |
| 7,836,178 B1 | 11/2010 | Bedell et al. |

(56) References Cited

U.S. PATENT DOCUMENTS

| | | |
|---|---|---|
| 7,865,440 B2 | 1/2011 | Jaquette |
| 7,870,599 B2 | 1/2011 | Pemmaraju |
| 7,908,626 B2 | 3/2011 | Williamson et al. |
| 7,917,008 B1* | 3/2011 | Lee .................. H04N 21/4583 386/291 |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,122,479 B2 | 2/2012 | Britt |
| 8,166,508 B2 | 4/2012 | Mitsuji et al. |
| 8,170,065 B2 | 5/2012 | Hasek et al. |
| 8,181,262 B2 | 5/2012 | Cooper et al. |
| 8,234,387 B2 | 7/2012 | Bradley et al. |
| 8,280,982 B2 | 10/2012 | La et al. |
| 8,290,351 B2 | 10/2012 | Plotnick et al. |
| 8,291,453 B2* | 10/2012 | Boortz .................. H04N 7/17327 725/42 |
| 8,332,370 B2 | 12/2012 | Gattegno et al. |
| 8,332,657 B1 | 12/2012 | Eskicioglu et al. |
| 8,341,242 B2 | 12/2012 | Dillon et al. |
| 8,359,351 B2* | 1/2013 | Istvan .................. H04N 7/163 709/203 |
| 8,365,212 B1 | 1/2013 | Orlowski |
| 8,392,952 B2 | 3/2013 | Carlucci et al. |
| 8,458,125 B1 | 6/2013 | Chong, Jr. et al. |
| 8,468,099 B2 | 6/2013 | Headings et al. |
| 8,472,627 B2 | 6/2013 | Denning et al. |
| 8,516,533 B2* | 8/2013 | Davis .................. H04H 60/61 725/115 |
| 8,520,850 B2 | 8/2013 | Helms et al. |
| 8,561,116 B2 | 10/2013 | Hasek |
| 8,634,703 B1* | 1/2014 | Barton .................. H04N 21/643 386/261 |
| 8,726,303 B2 | 5/2014 | Ellis, III |
| 8,732,854 B2* | 5/2014 | Cholas .................. H04L 63/062 726/29 |
| 8,761,402 B2 | 6/2014 | McAvoy et al. |
| 8,804,519 B2 | 8/2014 | Svedberg |
| 8,843,973 B2* | 9/2014 | Morrison .......... H04N 21/6582 725/87 |
| 8,949,923 B2* | 2/2015 | Muvavarirwa .... H04N 21/4126 725/139 |
| 8,997,136 B2 | 3/2015 | Brooks et al. |
| 9,071,859 B2 | 6/2015 | Lajoie |
| 9,178,634 B2 | 11/2015 | Tidwell et al. |
| 9,215,423 B2 | 12/2015 | Kimble et al. |
| 9,247,308 B2* | 1/2016 | Diaz Perez ........ H04N 21/4314 |
| 9,277,266 B2 | 3/2016 | Riedl et al. |
| 9,300,919 B2 | 3/2016 | Cholas et al. |
| 9,521,463 B2* | 12/2016 | Lee .................. H04N 21/43615 |
| 9,706,160 B2 | 7/2017 | Marsh et al. |
| 9,742,768 B2* | 8/2017 | Cholas .................. H04L 67/16 |
| 9,866,609 B2* | 1/2018 | Sarosi .................. H04L 65/4084 |
| 9,906,838 B2 | 2/2018 | Cronk et al. |
| 10,045,070 B2* | 8/2018 | Markley .............. H04N 21/6125 |
| 10,069,836 B2* | 9/2018 | Cholas .................. H04L 67/16 |
| 2001/0004768 A1 | 6/2001 | Hodge et al. |
| 2001/0013123 A1 | 8/2001 | Freeman et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0050901 A1 | 12/2001 | Love et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0004912 A1 | 1/2002 | Fung |
| 2002/0007485 A1* | 1/2002 | Rodriguez ......... H04N 7/17318 725/1 |
| 2002/0013772 A1 | 1/2002 | Peinado |
| 2002/0019984 A1 | 2/2002 | Rakib |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0044549 A1* | 4/2002 | Johansson .............. H04L 45/46 370/386 |
| 2002/0048367 A1 | 4/2002 | Maillard |
| 2002/0049902 A1 | 4/2002 | Rhodes |
| 2002/0049980 A1* | 4/2002 | Hoang .............. H04N 21/4623 725/91 |
| 2002/0053082 A1* | 5/2002 | Weaver, III ............ H04N 7/165 725/46 |
| 2002/0054589 A1 | 5/2002 | Ethridge et al. |
| 2002/0056125 A1 | 5/2002 | Hodge et al. |
| 2002/0059577 A1 | 5/2002 | Lu et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087975 A1 | 7/2002 | Schlack |
| 2002/0087976 A1 | 7/2002 | Kaplan et al. |
| 2002/0090914 A1* | 7/2002 | Kang .................. H04W 84/20 455/41.2 |
| 2002/0095684 A1 | 7/2002 | St John et al. |
| 2002/0100059 A1* | 7/2002 | Buehl .............. H04L 29/06027 725/116 |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0124249 A1 | 9/2002 | Shintani et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0141732 A1* | 10/2002 | Reese .................. H04N 5/765 386/223 |
| 2002/0144067 A1 | 10/2002 | Jeong |
| 2002/0144262 A1 | 10/2002 | Plotnick et al. |
| 2002/0144263 A1 | 10/2002 | Eldering et al. |
| 2002/0144275 A1 | 10/2002 | Kay et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0154655 A1 | 10/2002 | Gummalla et al. |
| 2002/0154885 A1 | 10/2002 | Covell et al. |
| 2002/0162109 A1 | 10/2002 | Shteyn |
| 2002/0163928 A1 | 11/2002 | Rudnick et al. |
| 2002/0164151 A1 | 11/2002 | Jasinschi et al. |
| 2002/0166119 A1 | 11/2002 | Cristofalo |
| 2002/0170057 A1 | 11/2002 | Barrett et al. |
| 2002/0174430 A1* | 11/2002 | Ellis .................. G11B 27/005 725/46 |
| 2002/0178447 A1 | 11/2002 | Plotnick et al. |
| 2002/0183985 A1 | 12/2002 | Hori et al. |
| 2002/0184154 A1 | 12/2002 | Hori et al. |
| 2002/0188744 A1 | 12/2002 | Mani |
| 2002/0188869 A1 | 12/2002 | Patrick |
| 2002/0196939 A1 | 12/2002 | Unger et al. |
| 2002/0199105 A1 | 12/2002 | Ishiguro et al. |
| 2003/0002862 A1 | 1/2003 | Rodriguez et al. |
| 2003/0004810 A1 | 1/2003 | Eldering |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0014759 A1 | 1/2003 | Van |
| 2003/0021412 A1 | 1/2003 | Candelore et al. |
| 2003/0021421 A1 | 1/2003 | Yokota et al. |
| 2003/0023981 A1 | 1/2003 | Lemmons |
| 2003/0025832 A1 | 2/2003 | Swart et al. |
| 2003/0033199 A1 | 2/2003 | Coleman |
| 2003/0037331 A1 | 2/2003 | Lee |
| 2003/0041336 A1 | 2/2003 | Del et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0067554 A1 | 4/2003 | Klarfeld |
| 2003/0069965 A1 | 4/2003 | Ma et al. |

(56) References Cited

U.S. PATENT DOCUMENTS

| | | |
|---|---|---|
| 2003/0074565 A1 | 4/2003 | Wasilewski et al. |
| 2003/0074571 A1 | 4/2003 | Fujiwara et al. |
| 2003/0077067 A1 | 4/2003 | Wu et al. |
| 2003/0084003 A1 | 5/2003 | Pinkas et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093790 A1* | 5/2003 | Logan .................. G11B 27/34 725/38 |
| 2003/0093792 A1 | 5/2003 | Labeeb et al. |
| 2003/0095791 A1 | 5/2003 | Barton et al. |
| 2003/0097340 A1 | 5/2003 | Okamoto et al. |
| 2003/0101449 A1 | 5/2003 | Bentolila et al. |
| 2003/0101451 A1 | 5/2003 | Bentolila et al. |
| 2003/0110499 A1 | 6/2003 | Knudson et al. |
| 2003/0115267 A1 | 6/2003 | Hinton et al. |
| 2003/0115612 A1 | 6/2003 | Mao et al. |
| 2003/0118014 A1 | 6/2003 | Iyer et al. |
| 2003/0122966 A1* | 7/2003 | Markman ........ H04N 21/47214 348/563 |
| 2003/0126086 A1* | 7/2003 | Safadi .................. G06F 21/10 705/51 |
| 2003/0135860 A1 | 7/2003 | Dureau |
| 2003/0139980 A1 | 7/2003 | Hamilton |
| 2003/0140227 A1 | 7/2003 | Asano et al. |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0182261 A1 | 9/2003 | Patterson |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0208783 A1 | 11/2003 | Hillen et al. |
| 2003/0214962 A1 | 11/2003 | Allaye-Chan et al. |
| 2003/0217137 A1 | 11/2003 | Roese et al. |
| 2003/0217365 A1 | 11/2003 | Caputo |
| 2003/0229681 A1 | 12/2003 | Levitan |
| 2003/0229900 A1* | 12/2003 | Reisman .......... H04N 21/42204 725/87 |
| 2003/0235393 A1* | 12/2003 | Boston .................. H04N 5/76 386/295 |
| 2003/0237090 A1* | 12/2003 | Boston .................. H04N 5/76 725/37 |
| 2004/0006625 A1 | 1/2004 | Saha et al. |
| 2004/0010807 A1 | 1/2004 | Urdang et al. |
| 2004/0024688 A1 | 2/2004 | Bi et al. |
| 2004/0031053 A1 | 2/2004 | Lim et al. |
| 2004/0034877 A1 | 2/2004 | Nogues |
| 2004/0045030 A1 | 3/2004 | Reynolds et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0052377 A1 | 3/2004 | Mattox et al. |
| 2004/0078602 A1 | 4/2004 | Rothbarth et al. |
| 2004/0078809 A1 | 4/2004 | Drazin |
| 2004/0088558 A1 | 5/2004 | Candelore |
| 2004/0101271 A1* | 5/2004 | Boston .................. G11B 19/00 386/295 |
| 2004/0103437 A1* | 5/2004 | Allegrezza ........ H04N 21/2225 725/95 |
| 2004/0109569 A1 | 6/2004 | Ellison et al. |
| 2004/0109672 A1 | 6/2004 | Kim et al. |
| 2004/0113936 A1 | 6/2004 | Dempski |
| 2004/0117836 A1 | 6/2004 | Karaoguz et al. |
| 2004/0123129 A1 | 6/2004 | Ginter et al. |
| 2004/0123313 A1 | 6/2004 | Koo et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0148503 A1* | 7/2004 | Sidman ................ H04L 63/123 713/167 |
| 2004/0158858 A1 | 8/2004 | Paxton et al. |
| 2004/0163109 A1 | 8/2004 | Kang et al. |
| 2004/0177369 A1 | 9/2004 | Akins |
| 2004/0179605 A1 | 9/2004 | Lane |
| 2004/0181800 A1 | 9/2004 | Rakib et al. |
| 2004/0184616 A1 | 9/2004 | Morten |
| 2004/0187150 A1 | 9/2004 | Gonder et al. |
| 2004/0187159 A1 | 9/2004 | Gaydos et al. |
| 2004/0190714 A1 | 9/2004 | Masui et al. |
| 2004/0190721 A1 | 9/2004 | Barrett et al. |
| 2004/0193609 A1 | 9/2004 | Phan et al. |
| 2004/0193648 A1* | 9/2004 | Lai ..................... H04N 21/4622 |
| 2004/0193680 A1 | 9/2004 | Gibbs et al. |
| 2004/0193704 A1 | 9/2004 | Smith |
| 2004/0194134 A1 | 9/2004 | Gunatilake et al. |
| 2004/0224425 A1 | 11/2004 | Gjerde et al. |
| 2004/0226044 A1 | 11/2004 | Goode |
| 2004/0237100 A1 | 11/2004 | Pinder et al. |
| 2004/0244058 A1 | 12/2004 | Carlucci et al. |
| 2004/0250273 A1 | 12/2004 | Swix et al. |
| 2004/0255336 A1 | 12/2004 | Logan et al. |
| 2004/0260798 A1 | 12/2004 | Addington et al. |
| 2004/0261093 A1 | 12/2004 | Rebaud et al. |
| 2004/0261114 A1 | 12/2004 | Addington et al. |
| 2004/0261116 A1 | 12/2004 | McKeown et al. |
| 2004/0267880 A1 | 12/2004 | Patiejunas |
| 2004/0267965 A1* | 12/2004 | Vasudevan ................ G06F 9/50 709/250 |
| 2004/0268386 A1 | 12/2004 | Logan et al. |
| 2005/0005287 A1 | 1/2005 | Claussen |
| 2005/0010697 A1 | 1/2005 | Kinawi et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039206 A1 | 2/2005 | Opdycke |
| 2005/0039212 A1 | 2/2005 | Baran et al. |
| 2005/0041679 A1 | 2/2005 | Weinstein et al. |
| 2005/0047596 A1 | 3/2005 | Suzuki |
| 2005/0049886 A1 | 3/2005 | Grannan et al. |
| 2005/0050160 A1 | 3/2005 | Upendran et al. |
| 2005/0055220 A1 | 3/2005 | Lee et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0063541 A1* | 3/2005 | Candelore .......... H04N 21/8355 380/239 |
| 2005/0065888 A1 | 3/2005 | Benaloh |
| 2005/0071663 A1* | 3/2005 | Medvinsky ...... H04N 21/43615 726/26 |
| 2005/0071669 A1 | 3/2005 | Medvinsky |
| 2005/0071882 A1* | 3/2005 | Rodriguez ............. H04N 20/38 725/95 |
| 2005/0076092 A1* | 4/2005 | Chang ..................... G06F 21/10 709/217 |
| 2005/0086326 A1* | 4/2005 | Manning ................ H04L 67/06 709/219 |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0097598 A1* | 5/2005 | Pedlow, Jr. ...... H04N 21/23476 725/31 |
| 2005/0108529 A1 | 5/2005 | Juneau |
| 2005/0108763 A1 | 5/2005 | Baran et al. |
| 2005/0108768 A1 | 5/2005 | Deshpande et al. |
| 2005/0108769 A1 | 5/2005 | Arnold et al. |
| 2005/0111844 A1 | 5/2005 | Compton et al. |

(56) References Cited

U.S. PATENT DOCUMENTS

| | | |
|---|---|---|
| 2005/0114141 A1 | 5/2005 | Grody |
| 2005/0114686 A1 | 5/2005 | Ball et al. |
| 2005/0114900 A1* | 5/2005 | Ladd ............... H04N 21/818 725/100 |
| 2005/0120386 A1* | 6/2005 | Stone ............... H04N 5/765 725/134 |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0138357 A1 | 6/2005 | Swenson et al. |
| 2005/0152397 A1 | 7/2005 | Bai et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0182972 A1* | 8/2005 | Apostolopoulos ..... H04N 21/84 726/19 |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198686 A1 | 9/2005 | Krause et al. |
| 2005/0198693 A1 | 9/2005 | Choi et al. |
| 2005/0204065 A1* | 9/2005 | Son ............... H04L 12/2807 709/204 |
| 2005/0210500 A1 | 9/2005 | Stone |
| 2005/0210510 A1* | 9/2005 | Danker ............ H04N 21/44222 725/52 |
| 2005/0216942 A1* | 9/2005 | Barton ............ H04N 21/43632 725/97 |
| 2005/0223409 A1 | 10/2005 | Rautila et al. |
| 2005/0251821 A1* | 11/2005 | Pina ............... H04N 21/4126 725/39 |
| 2005/0268107 A1 | 12/2005 | Harris et al. |
| 2005/0273629 A1 | 12/2005 | Abrams et al. |
| 2005/0276284 A1 | 12/2005 | Krause et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0010075 A1 | 1/2006 | Wolf |
| 2006/0015352 A1 | 1/2006 | Wynn et al. |
| 2006/0020786 A1 | 1/2006 | Helms et al. |
| 2006/0020950 A1 | 1/2006 | Ladd et al. |
| 2006/0020984 A1 | 1/2006 | Ban et al. |
| 2006/0021004 A1 | 1/2006 | Moran et al. |
| 2006/0036750 A1 | 2/2006 | Ladd et al. |
| 2006/0037060 A1 | 2/2006 | Simms et al. |
| 2006/0041903 A1 | 2/2006 | Kahn et al. |
| 2006/0041905 A1 | 2/2006 | Wasilewski |
| 2006/0041910 A1* | 2/2006 | Hatanaka ............ H04N 5/765 725/58 |
| 2006/0047801 A1 | 3/2006 | Haag et al. |
| 2006/0047957 A1 | 3/2006 | Helms et al. |
| 2006/0050784 A1* | 3/2006 | Lappalainen ........ H04N 19/172 375/240.03 |
| 2006/0059098 A1 | 3/2006 | Major et al. |
| 2006/0059342 A1* | 3/2006 | Medvinsky ...... H04N 21/26606 713/168 |
| 2006/0062059 A1 | 3/2006 | Smith et al. |
| 2006/0064583 A1 | 3/2006 | Birnbaum et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0075449 A1 | 4/2006 | Jagadeesan et al. |
| 2006/0080408 A1* | 4/2006 | Istvan ............... G06F 16/95 709/219 |
| 2006/0084417 A1 | 4/2006 | Melpignano et al. |
| 2006/0085824 A1* | 4/2006 | Bruck ............... H04N 21/632 725/86 |
| 2006/0088063 A1 | 4/2006 | Hartung et al. |
| 2006/0095940 A1 | 5/2006 | Yearwood |
| 2006/0117374 A1* | 6/2006 | Kortum ............ H04N 21/84 725/139 |
| 2006/0127039 A1 | 6/2006 | Van |
| 2006/0130099 A1 | 6/2006 | Rooyen |
| 2006/0130107 A1* | 6/2006 | Gonder ............ H04N 21/2383 725/110 |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0140584 A1* | 6/2006 | Ellis ............... G11B 27/034 386/238 |
| 2006/0148362 A1 | 7/2006 | Bridges |
| 2006/0149850 A1 | 7/2006 | Bowman |
| 2006/0156352 A1* | 7/2006 | Smith ............... H04N 21/235 725/86 |
| 2006/0161635 A1 | 7/2006 | Lamkin et al. |
| 2006/0168219 A1 | 7/2006 | Ahluwalia et al. |
| 2006/0171390 A1 | 8/2006 | La |
| 2006/0171423 A1 | 8/2006 | Helms et al. |
| 2006/0173783 A1* | 8/2006 | Marples ............ H04L 63/0428 705/51 |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0197828 A1 | 9/2006 | Zeng et al. |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0212906 A1* | 9/2006 | Cantalini ............ H04N 21/4332 725/62 |
| 2006/0218601 A1 | 9/2006 | Michel |
| 2006/0218604 A1 | 9/2006 | Riedl et al. |
| 2006/0218620 A1* | 9/2006 | Nadarajah .......... H04N 7/17318 725/151 |
| 2006/0218647 A1 | 9/2006 | Hars et al. |
| 2006/0235800 A1* | 10/2006 | Furlong ............ H04N 21/2541 705/59 |
| 2006/0236131 A1 | 10/2006 | Vauclair |
| 2006/0248553 A1* | 11/2006 | Mikkelson ............ H04H 60/27 725/23 |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0259927 A1 | 11/2006 | Acharya et al. |
| 2006/0271946 A1 | 11/2006 | Woundy et al. |
| 2006/0277569 A1 | 12/2006 | Smith |
| 2006/0291506 A1 | 12/2006 | Cain |
| 2006/0294250 A1 | 12/2006 | Stone et al. |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0039033 A1* | 2/2007 | Ota ............... H04N 21/4147 725/115 |
| 2007/0046791 A1 | 3/2007 | Wang et al. |
| 2007/0047449 A1 | 3/2007 | Berger et al. |
| 2007/0049245 A1 | 3/2007 | Lipman |
| 2007/0053293 A1* | 3/2007 | McDonald ........ H04N 21/25825 370/235 |
| 2007/0058924 A1* | 3/2007 | Yeh ............... H04L 12/2803 386/237 |
| 2007/0061149 A1* | 3/2007 | Chang ............ H04N 21/4828 704/275 |
| 2007/0061818 A1 | 3/2007 | Williams et al. |
| 2007/0067851 A1 | 3/2007 | Fernando et al. |
| 2007/0076728 A1 | 4/2007 | Rieger et al. |
| 2007/0078910 A1 | 4/2007 | Bopardikar |

(56) References Cited

U.S. PATENT DOCUMENTS

| | | | |
|---|---|---|---|
| 2007/0079342 A1* | 4/2007 | Ellis | H04N 21/6336 725/89 |
| 2007/0079381 A1 | 4/2007 | Hartung et al. | |
| 2007/0089127 A1 | 4/2007 | Flickinger et al. | |
| 2007/0094691 A1 | 4/2007 | Gazdzinski | |
| 2007/0098178 A1 | 5/2007 | Raikar | |
| 2007/0101157 A1 | 5/2007 | Faria | |
| 2007/0101370 A1 | 5/2007 | Calderwood | |
| 2007/0104456 A1 | 5/2007 | Craner | |
| 2007/0106805 A1* | 5/2007 | Marples | H04L 67/104 709/229 |
| 2007/0113243 A1 | 5/2007 | Brey | |
| 2007/0118852 A1 | 5/2007 | Calderwood | |
| 2007/0121569 A1 | 5/2007 | Fukui et al. | |
| 2007/0121678 A1 | 5/2007 | Brooks et al. | |
| 2007/0124416 A1 | 5/2007 | Casey et al. | |
| 2007/0124488 A1 | 5/2007 | Baum et al. | |
| 2007/0124602 A1 | 5/2007 | Wald et al. | |
| 2007/0124781 A1 | 5/2007 | Casey et al. | |
| 2007/0130581 A1 | 6/2007 | Del et al. | |
| 2007/0133405 A1 | 6/2007 | Bowra et al. | |
| 2007/0150963 A1* | 6/2007 | Lee | G06F 21/32 726/27 |
| 2007/0153820 A1 | 7/2007 | Gould | |
| 2007/0156539 A1 | 7/2007 | Yates | |
| 2007/0157234 A1 | 7/2007 | Walker | |
| 2007/0157295 A1 | 7/2007 | Mangalore et al. | |
| 2007/0162927 A1 | 7/2007 | Ramaswamy et al. | |
| 2007/0162971 A1* | 7/2007 | Blom | H04L 67/06 726/17 |
| 2007/0174888 A1 | 7/2007 | Rubinstein | |
| 2007/0192615 A1 | 8/2007 | Varghese et al. | |
| 2007/0204300 A1 | 8/2007 | Markley et al. | |
| 2007/0204310 A1 | 8/2007 | Hua et al. | |
| 2007/0204311 A1 | 8/2007 | Hasek et al. | |
| 2007/0204313 A1 | 8/2007 | McEnroe et al. | |
| 2007/0204314 A1 | 8/2007 | Hasek et al. | |
| 2007/0206799 A1 | 9/2007 | Wingert et al. | |
| 2007/0209059 A1 | 9/2007 | Moore et al. | |
| 2007/0217436 A1 | 9/2007 | Markley et al. | |
| 2007/0219910 A1 | 9/2007 | Martinez | |
| 2007/0220024 A1 | 9/2007 | Putterman et al. | |
| 2007/0223380 A1 | 9/2007 | Gilbert et al. | |
| 2007/0233857 A1 | 10/2007 | Cheng et al. | |
| 2007/0241176 A1 | 10/2007 | Epstein et al. | |
| 2007/0250872 A1 | 10/2007 | Dua | |
| 2007/0250880 A1 | 10/2007 | Hainline | |
| 2007/0261116 A1 | 11/2007 | Prafullchandra et al. | |
| 2007/0271386 A1 | 11/2007 | Kurihara et al. | |
| 2007/0274400 A1 | 11/2007 | Murai et al. | |
| 2007/0276925 A1 | 11/2007 | La et al. | |
| 2007/0276926 A1 | 11/2007 | Lajoie et al. | |
| 2007/0294178 A1 | 12/2007 | Pinder et al. | |
| 2008/0008321 A1 | 1/2008 | Gagnon et al. | |
| 2008/0008371 A1 | 1/2008 | Woods et al. | |
| 2008/0015997 A1* | 1/2008 | Moroney | G06F 21/10 705/51 |
| 2008/0016526 A1 | 1/2008 | Asmussen | |
| 2008/0021836 A1 | 1/2008 | Lao | |
| 2008/0022012 A1 | 1/2008 | Wang | |
| 2008/0022308 A1 | 1/2008 | Garcea | H04N 21/482 725/46 |
| 2008/0022330 A1 | 1/2008 | Barrett | H04N 21/4583 725/89 |
| 2008/0040403 A1* | 2/2008 | Hayashi | H04L 65/605 |
| 2008/0046922 A1* | 2/2008 | Jankins | H04N 21/25841 725/35 |
| 2008/0052157 A1 | 2/2008 | Kadambi et al. | |
| 2008/0059804 A1 | 3/2008 | Shah et al. | |
| 2008/0066112 A1* | 3/2008 | Bailey | H04N 5/765 725/58 |
| 2008/0081699 A1* | 4/2008 | Haeuser | H04N 21/47202 463/42 |
| 2008/0082688 A1* | 4/2008 | Yi | H04L 67/306 709/246 |
| 2008/0091805 A1 | 4/2008 | Malaby et al. | |
| 2008/0091807 A1 | 4/2008 | Strub et al. | |
| 2008/0092181 A1 | 4/2008 | Britt | |
| 2008/0098212 A1 | 4/2008 | Helms et al. | |
| 2008/0098446 A1 | 4/2008 | Seckin et al. | |
| 2008/0101460 A1 | 5/2008 | Rodriguez | |
| 2008/0103976 A1 | 5/2008 | Read et al. | |
| 2008/0103977 A1 | 5/2008 | Khosravy et al. | |
| 2008/0112405 A1* | 5/2008 | Cholas | H04L 63/10 370/389 |
| 2008/0117920 A1 | 5/2008 | Tucker | |
| 2008/0118063 A1* | 5/2008 | Guzman | H04N 21/25816 380/239 |
| 2008/0123862 A1 | 5/2008 | Rowley | |
| 2008/0133551 A1 | 6/2008 | Wensley et al. | |
| 2008/0133569 A1* | 6/2008 | Vu | H04N 21/4828 |
| 2008/0134156 A1 | 6/2008 | Osminer et al. | |
| 2008/0134165 A1* | 6/2008 | Anderson | H04N 21/4586 717/173 |
| 2008/0134615 A1 | 6/2008 | Risi et al. | |
| 2008/0141175 A1 | 6/2008 | Sarna et al. | |
| 2008/0141317 A1 | 6/2008 | Radloff et al. | |
| 2008/0141353 A1 | 6/2008 | Brown | |
| 2008/0148362 A1 | 6/2008 | Gilder et al. | |
| 2008/0152316 A1* | 6/2008 | Sylvain | H04N 21/6125 386/240 |
| 2008/0154626 A1 | 6/2008 | Gounares et al. | |
| 2008/0155059 A1* | 6/2008 | Hardin | H04N 21/4828 709/218 |
| 2008/0159714 A1* | 7/2008 | Harrar | H04N 5/782 386/291 |
| 2008/0162353 A1 | 7/2008 | Tom et al. | |
| 2008/0165460 A1 | 7/2008 | Whitby-Strevens | |
| 2008/0177998 A1 | 7/2008 | Apsangi et al. | |
| 2008/0184297 A1* | 7/2008 | Ellis | H04N 21/632 725/39 |
| 2008/0189617 A1* | 8/2008 | Covell | H04L 63/102 715/738 |
| 2008/0192820 A1 | 8/2008 | Brooks et al. | |
| 2008/0201748 A1* | 8/2008 | Hasek | H04N 21/454 725/98 |
| 2008/0209464 A1 | 8/2008 | Wright-Riley | |
| 2008/0212945 A1 | 9/2008 | Khedouri et al. | |
| 2008/0212947 A1* | 9/2008 | Nesvadba | H04N 21/84 386/291 |
| 2008/0222684 A1 | 9/2008 | Mukraj et al. | |
| 2008/0229354 A1 | 9/2008 | Morris et al. | |
| 2008/0235732 A1 | 9/2008 | Han et al. | |
| 2008/0235746 A1* | 9/2008 | Peters | H04N 21/6168 725/111 |
| 2008/0244667 A1 | 10/2008 | Osborne | |
| 2008/0244682 A1* | 10/2008 | Sparrell | H04N 21/658 725/134 |
| 2008/0256510 A1 | 10/2008 | Auerbach | |
| 2008/0267403 A1* | 10/2008 | Boult | H04L 9/0894 380/255 |
| 2008/0270307 A1 | 10/2008 | Olson et al. | |
| 2008/0271068 A1 | 10/2008 | Ou et al. | |
| 2008/0273591 A1* | 11/2008 | Brooks | H04L 41/0896 375/240.01 |
| 2008/0276270 A1 | 11/2008 | Kotaru et al. | |
| 2008/0282299 A1 | 11/2008 | Koat et al. | |
| 2008/0288618 A1 | 11/2008 | Vardi et al. | |
| 2008/0288996 A1* | 11/2008 | Walter | H04N 21/4788 725/131 |
| 2008/0307339 A1* | 12/2008 | Boro | H04L 63/08 715/764 |
| 2009/0007234 A1 | 1/2009 | Birger et al. | |
| 2009/0010610 A1* | 1/2009 | Scholl | H04N 21/4135 386/314 |
| 2009/0019485 A1* | 1/2009 | Ellis | H04N 21/4316 725/40 |
| 2009/0019492 A1* | 1/2009 | Grasset | G06F 16/178 725/45 |
| 2009/0025027 A1 | 1/2009 | Craner | |

(56) References Cited

U.S. PATENT DOCUMENTS

| | | |
|---|---|---|
| 2009/0025075 A1 | 1/2009 | Chow et al. |
| 2009/0028182 A1* | 1/2009 | Brooks ............... H04L 41/0896 370/466 |
| 2009/0031371 A1 | 1/2009 | Munsell et al. |
| 2009/0037960 A1 | 2/2009 | Melby |
| 2009/0052863 A1* | 2/2009 | Parmar ................. H04N 5/765 386/323 |
| 2009/0052870 A1* | 2/2009 | Marsh ............. H04N 21/47214 386/292 |
| 2009/0055213 A1* | 2/2009 | Kawahata ............. G06Q 30/04 705/323 |
| 2009/0077614 A1* | 3/2009 | White ................. H04N 21/632 725/139 |
| 2009/0083813 A1 | 3/2009 | Dolce et al. |
| 2009/0089882 A1* | 4/2009 | Hofmann ........... H04N 21/4623 726/28 |
| 2009/0098861 A1 | 4/2009 | Kalliola et al. |
| 2009/0100147 A1 | 4/2009 | Igarashi |
| 2009/0100182 A1 | 4/2009 | Chaudhry |
| 2009/0100459 A1 | 4/2009 | Riedl et al. |
| 2009/0102983 A1 | 4/2009 | Malone et al. |
| 2009/0144237 A1* | 6/2009 | Branam ............... G06Q 20/123 |
| 2009/0151006 A1 | 6/2009 | Saeki et al. |
| 2009/0165053 A1* | 6/2009 | Thyagarajan ........ H04N 21/482 725/46 |
| 2009/0182815 A1 | 7/2009 | Czechowski, III et al. |
| 2009/0185576 A1 | 7/2009 | Kisel et al. |
| 2009/0199238 A1* | 8/2009 | Kummer .......... H04N 21/44222 725/39 |
| 2009/0201917 A1 | 8/2009 | Maes et al. |
| 2009/0207866 A1* | 8/2009 | Cholas ................ H04L 12/2801 370/505 |
| 2009/0210899 A1 | 8/2009 | Lawrence-Apfelbaum et al. |
| 2009/0210912 A1* | 8/2009 | Cholas ................ H04N 21/426 725/82 |
| 2009/0217326 A1 | 8/2009 | Hasek |
| 2009/0217332 A1* | 8/2009 | Hindle ............... H04N 21/6543 725/109 |
| 2009/0220216 A1* | 9/2009 | Marsh .................... H04N 5/781 386/292 |
| 2009/0225760 A1 | 9/2009 | Foti |
| 2009/0254600 A1* | 10/2009 | Lee ....................... H04N 21/482 709/201 |
| 2009/0260042 A1* | 10/2009 | Chiang ............... H04L 12/2838 725/80 |
| 2009/0265750 A1 | 10/2009 | Jones et al. |
| 2009/0274212 A1 | 11/2009 | Mizutani et al. |
| 2009/0282241 A1 | 11/2009 | Prafullchandra et al. |
| 2009/0282449 A1 | 11/2009 | Lee |
| 2009/0285391 A1* | 11/2009 | Johnson .............. H04N 21/4367 380/200 |
| 2009/0290711 A1 | 11/2009 | Bloom et al. |
| 2009/0292922 A1 | 11/2009 | Park |
| 2009/0293101 A1 | 11/2009 | Carter et al. |
| 2009/0317065 A1* | 12/2009 | Fyock ................ H04N 21/6581 386/200 |
| 2010/0017627 A1 | 1/2010 | Princen et al. |
| 2010/0030578 A1 | 2/2010 | Siddique et al. |
| 2010/0031299 A1 | 2/2010 | Harrang et al. |
| 2010/0033331 A1* | 2/2010 | Bautovich .............. G01V 8/12 340/573.1 |
| 2010/0042478 A1 | 2/2010 | Reisman |
| 2010/0043030 A1* | 2/2010 | White .................... H04N 5/765 725/58 |
| 2010/0061708 A1* | 3/2010 | Barton ............... H04N 21/4826 386/241 |
| 2010/0070997 A1* | 3/2010 | Friedman ............... G06F 3/0486 725/37 |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0131973 A1 | 5/2010 | Dillon et al. |
| 2010/0138900 A1 | 6/2010 | Peterka et al. |
| 2010/0142448 A1* | 6/2010 | Schlicht ............... H04W 28/021 370/328 |
| 2010/0153997 A1* | 6/2010 | Baumgartner ...... H04N 21/47202 725/39 |
| 2010/0157928 A1 | 6/2010 | Spinar et al. |
| 2010/0169977 A1 | 7/2010 | Dasher et al. |
| 2010/0185855 A1 | 7/2010 | Margolus et al. |
| 2010/0198888 A1* | 8/2010 | Blomstedt ............... G06F 16/40 707/827 |
| 2010/0217837 A1 | 8/2010 | Ansari et al. |
| 2010/0218223 A1* | 8/2010 | Simpson ........... H04N 21/47214 725/58 |
| 2010/0223491 A1 | 9/2010 | Ladd et al. |
| 2010/0223660 A1* | 9/2010 | Scott ................... H04N 21/2541 726/4 |
| 2010/0223673 A1* | 9/2010 | Scott ................... G06F 21/6218 726/28 |
| 2010/0247067 A1* | 9/2010 | Gratton ............... H04N 21/4334 386/291 |
| 2010/0251289 A1 | 9/2010 | Agarwal et al. |
| 2010/0251304 A1 | 9/2010 | Donoghue et al. |
| 2010/0281506 A1* | 11/2010 | Schmidt ............... H04N 21/432 725/46 |
| 2010/0287609 A1* | 11/2010 | Gonzalez ........... H04N 21/4623 726/14 |
| 2010/0310076 A1 | 12/2010 | Barzilai et al. |
| 2010/0312826 A1* | 12/2010 | Sarosi .................. H04L 65/4084 709/203 |
| 2010/0313225 A1 | 12/2010 | Cholas et al. |
| 2010/0313226 A1 | 12/2010 | Cholas et al. |
| 2011/0010741 A1* | 1/2011 | Liao ................... H04N 7/17318 725/51 |
| 2011/0071841 A1* | 3/2011 | Fomenko ............ G06F 16/1834 705/1.1 |
| 2011/0078721 A1* | 3/2011 | Wang .................. H04N 21/835 725/25 |
| 2011/0093900 A1* | 4/2011 | Patel .................... H04N 21/2343 725/54 |
| 2011/0103374 A1 | 5/2011 | Lajoie et al. |
| 2011/0107379 A1 | 5/2011 | Lajoie et al. |
| 2011/0138409 A1* | 6/2011 | Svensson ............ H04N 21/4751 725/25 |
| 2011/0162007 A1 | 6/2011 | Karaoguz et al. |
| 2011/0164753 A1* | 7/2011 | Dubhashi ........... H04N 21/4623 380/282 |
| 2011/0169977 A1 | 7/2011 | Masuda |
| 2011/0179196 A1 | 7/2011 | Friedman |
| 2011/0197070 A1 | 8/2011 | Mizrah |
| 2011/0206200 A1 | 8/2011 | Sovio et al. |
| 2011/0213688 A1 | 9/2011 | Santos et al. |
| 2011/0219229 A1* | 9/2011 | Cholas ..................... H04L 9/32 713/168 |
| 2011/0252236 A1 | 10/2011 | De et al. |
| 2011/0252243 A1* | 10/2011 | Brouwer ................. G06F 21/62 713/189 |
| 2011/0264530 A1 | 10/2011 | Santangelo et al. |
| 2012/0008786 A1 | 1/2012 | Cronk et al. |
| 2012/0011567 A1 | 1/2012 | Cronk et al. |
| 2012/0014255 A1* | 1/2012 | Svedberg ................ H04L 67/18 370/235 |
| 2012/0030714 A1 | 2/2012 | Sweatt, III et al. |
| 2012/0089699 A1* | 4/2012 | Cholas .................. G06F 21/10 709/217 |
| 2012/0131629 A1 | 5/2012 | Shrum, Jr. et al. |
| 2012/0159603 A1 | 6/2012 | Queck |
| 2012/0167173 A1 | 6/2012 | Nadalin et al. |
| 2012/0210382 A1 | 8/2012 | Walker et al. |
| 2012/0260346 A1 | 10/2012 | Carey et al. |
| 2012/0278841 A1 | 11/2012 | Hasek et al. |
| 2012/0291062 A1 | 11/2012 | Pearson et al. |
| 2013/0191443 A1 | 7/2013 | Gan et al. |
| 2013/0227608 A1 | 8/2013 | Evans et al. |
| 2013/0309971 A1 | 11/2013 | Kiukkonen et al. |
| 2013/0318629 A1 | 11/2013 | Lajoie et al. |
| 2013/0325870 A1 | 12/2013 | Rouse et al. |

(56) References Cited

U.S. PATENT DOCUMENTS

| | | |
|---|---|---|
| 2013/0347089 A1 | 12/2013 | Bailey et al. |
| 2014/0189749 A1 | 7/2014 | Gordon et al. |
| 2014/0233923 A1 | 8/2014 | Bradley et al. |
| 2014/0281489 A1 | 9/2014 | Peterka et al. |
| 2014/0282750 A1 | 9/2014 | Civiletto |
| 2014/0283137 A1 | 9/2014 | Rebaud et al. |
| 2014/0344897 A1* | 11/2014 | Cholas ............... H04L 63/08 726/4 |
| 2015/0271541 A1 | 9/2015 | Gonder et al. |
| 2015/0324379 A1 | 11/2015 | Danovitz et al. |
| 2016/0050190 A1 | 2/2016 | Mooij et al. |
| 2016/0165650 A1 | 6/2016 | Kim et al. |
| 2016/0165651 A1 | 6/2016 | Pathuri et al. |
| 2016/0301525 A1 | 10/2016 | Canard et al. |
| 2016/0307596 A1 | 10/2016 | Hardin et al. |
| 2018/0069862 A1* | 3/2018 | Cholas ............... H04L 63/10 |
| 2018/0131975 A1 | 5/2018 | Badawiyeh et al. |
| 2018/0219931 A1* | 8/2018 | Sarosi ............ H04L 65/4084 |
| 2019/0068677 A1* | 2/2019 | Sarosi ............ H04L 65/4084 |
| 2019/0268643 A1* | 8/2019 | Raley ............ H04N 21/2541 |

FOREIGN PATENT DOCUMENTS

| | | |
|---|---|---|
| EP | 2113860 A1 | 11/2009 |
| GB | 2381709 A | 5/2003 |
| GB | 2405567 A | 3/2005 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2007534030 A | 11/2007 |
| JP | 2007336553 A | 12/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2008539631 A | 11/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0176236 A1 | 10/2001 |
| WO | WO-0177778 A2 | 10/2001 |
| WO | WO-0191474 A2 | 11/2001 |
| WO | WO-0213032 A1 | 2/2002 |
| WO | WO-0219581 A1 | 3/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004008693 A1 | 1/2004 |
| WO | WO-2004027622 A2 | 4/2004 |
| WO | WO-2005015422 A1 | 2/2005 |
| WO | WO-2006020141 A2 | 2/2006 |
| WO | WO-2006063194 A2 | 6/2006 |
| WO | WO-2008070062 A2 | 6/2008 |
| WO | WO-2008080556 A1 | 7/2008 |
| WO | WO-2009020476 A2 | 2/2009 |
| WO | WO-2012021245 A1 | 2/2012 |

OTHER PUBLICATIONS

5C Digital Transmission Content Protection White Paper, Hitachi, Ltd., et al., dated Jul. 14, 1998, 15 pages.

CableLabs Asset Distribution Interface (ADI) Specification, Version 1 1, MD-SP-ADI1.103-040107, Jan. 7, 2004. pp. 1-26.

Cantor, et al., Assertions and Protocols for the OASIS Security Assertion Markup Language (SAML) V2.0, Oasis Standard, Mar. 15 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, Oasis Standard, Mar. 2005, Document ID saml-bindings-2.0-os ,(http://docs.oasis-open.org/security/saml/v2.0/saml-bindings-2.0-os.pdf).

Cisco Intelligent Network Architecture for Digital Video—SCTE Cable-Tec Expo 2004 information page, Orange County Convention Center, Jun. 2004, 24 pages.

DCAS Authorized Service Domain, Version 1.2, dated Nov. 4, 2008, 58 pages.

DCAS Authorized Service Domain, Version 1.2, Nov. 30, 2005, 56 pages.

DCAS Licensed Specification Abstracts, CableLabs Confidential Information, Jan. 12, 2006, 4 pages.

Deering et al., Internet Protocol, Version 6 (Ipv6) Specification, IETF RFC 2460 (Dec. 1998).

Digital Video Broadcasting (DVB); DVB SimulCrypt; Part 1: "Head-end architecture and synchronization" Technical Specification—ETSI TS 101 197 V1.2.1 (Feb. 2002), 40 pages.

DOCSIS 1.0: Cable Modem to Customer Premise Equipment Interface Specification, dated Nov. 3, 2008, 64 pages.

DOCSIS 1.1: Operations Support System Interface Specification, dated Sep. 6, 2005, 242 pages.

DOCSIS 1.1: Radio Frequency Interface Specification, dated Sep. 6, 2005, 436 pages.

DOCSIS 2.0: Radio Frequency Interface Specification, dated Apr. 21, 2009, 499 pages.

DOCSIS 3.0: Cable Modem to CPE Interface Specification, dated May 9, 2017, 19 pages.

DOCSIS 3.0: MAC and Upper Layer Protocols Interface Specification, dated Jan. 10, 2017, 795 pages.

DOCSIS 3.0: Operations Support System Interface Specification, dated Jan. 10, 2017, 547 pages.

DOCSIS 3.0: Physical Layer Specification, dated Jan. 10, 2017, 184 pages.

DOCSIS 3.1: Cable Modem Operations Support System Interface Specification, dated May 9, 2017, 308 pages.

DOCSIS 3.1: CCAP Operations Support System Interface Specification, dated May 9, 2017, 703 pages.

DOCSIS 3.1: MAC and Upper Layer Protocols Interface Specification, dated May 9, 2017, 838 pages.

DOCSIS 3.1: Physical Layer Specification, dated May 9, 2017, 249 pages.

(56) References Cited

OTHER PUBLICATIONS

DVB (Digital Video Broadcasting), DVB Document A045 Rev. 3, Jul. 2004, "Head-end Implementation of SimulCrypt," 289 pages.
Federal Information Processing Standards Publication, US FIPS PUB 197, Nov. 26, 2001, "Advanced Encryption Standards (AES)," 47 pages.
Griffith, et al.,Resource Planning and Bandwidth Allocation in Hybrid Fiber-Coax Residential Networks, National Institute of Standards and Technology (NIST), 10 pages, no date.
High-bandwidth Digital Content Protection System, Revision 1.091, dated Apr. 22, 2003, Digital Content Protection LLC Draft, 78 pages.
Internet Protocol DARPA Internet Program Protocol Specification, IETF RFC 791 (Sep. 1981).
Kanouff, Communications Technology: Next-Generation Bandwidth Management—The Evolution of the Anything-to-Anywhere Network, 8 pages, Apr. 1, 2004.
Marusic, et al., "Share it!—Content Transfer in Home-to-Home Networks." IEEE Melecon 2004, May 12-15, 2004, Dubrovnik, Croatia.
Media Server; 1 Device Template Version 1.01 Jun. 25, 2002.
Motorola DOCSIS Cable Module DCM 2000 specifications, 4 pages, copyright 2001.
OpenCable Application Platform Specification, OCAP 2.0 Profile, OC-SP-OCAP2.0-101-020419, Apr. 19, 2002.
OpenCable Application Platform Specifications, OCAP Extensions, OC-SP-OcAP--HNEXT-I03-080418, 2005-2008.
OpenCable Host Device, Core Functional Requirements, OC-SP-HOST-CFR-I13-030707, Jul. 7, 2003.
OpenCable, HOST-POD Interface Specification, OC-SP-HOSTPOD-IF-113-030707, Jul. 7, 2003.
OpenCable Specification, Home Networking Protocol 2.0, OC-SP-HNP2.0-101-08418, 2007.
OpenCable Specifications, Home Networking Security Specification, OC-SP-HN-SEC-DO1-081027, draft (Oct. 27, 2008).
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, no date, (http://www.imake.com/hopenvision).
Primergy BX300 Switch Blade user's manual, Fujitsu Corp., Sep. 30, 2002, first edition, pp. 1 to 20.
Zhang, et al., "A Flexible Content Protection System for Media-On-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0- 7695-1857-2.
Real System Media Commerce Suite (Technical White Paper), at http://docs.real.com/docs/drm/DRM.sub-WP1.pdf, 12 pages, Nov. 2001.
Real System Media Commerce Suite Technical White Paper, Copyright 2011, Real Networks, Inc., 16 pages, (http://www.realnetworkis).
RealSystem Media Commerce Suite Technical White Paper, Copyrgt, 2001 RealNetworks, Inc., http://www.realnetworks.com, 16 pages.
SCTE 130-1 2008 Digital Program Insertion—Advertising Systems Interfaces standards.
SCTE 130-1 2013. Part 1: Digital Program Insertion—Advertising Systems Interfaces, Part 1—Advertising Systems Overview, 20 pages.
SCTE 130-10 2013: Digital Program Insertion—Advertising Systems Interfaces Part 10—Stream Restriction Data Model.
SCTE 130-2 2008a: Digital Program Insertion—Advertising Systems Interfaces Part 2—Core Data Elements.
SCTE 130-2 2014 Digital Program Insertion—Advertising Systems Interfaces standards.
SCTE 130-3 2013: Digital Program Insertion—Advertising Systems Interfaces Part 3—Ad Management Service Interface.
SCTE 130-4 2009: Digital Program Insertion—Advertising Systems Interfaces Part 4—Content Information Service.
SCTE 130-5 2010: Digital Program Insertion—Advertising Systems Interfaces Part 5—Placement Opportunity Information Service.
SCTE 130-6 2010: Digital Program Insertion—Advertising Systems Interfaces Part 6—Subscriber Information Service.
SCTE 130-7 2009: Digital Program Insertion—Advertising Systems Interfaces Part 7—Message Transport.
SCTE 130-8 2010a: Digital Program Insertion Advertising Systems Interfaces Part 8—General Information Service.
SCTE 130-9 2014: Recommended Practices for SCTE 130 Digital Program Insertion—Advertising Systems Interfaces.
SCTE130-3 2010: Digital Program Insertion—Advertising Systems Interfaces Part 3—Ad Management Service Interface.
Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

\* cited by examiner

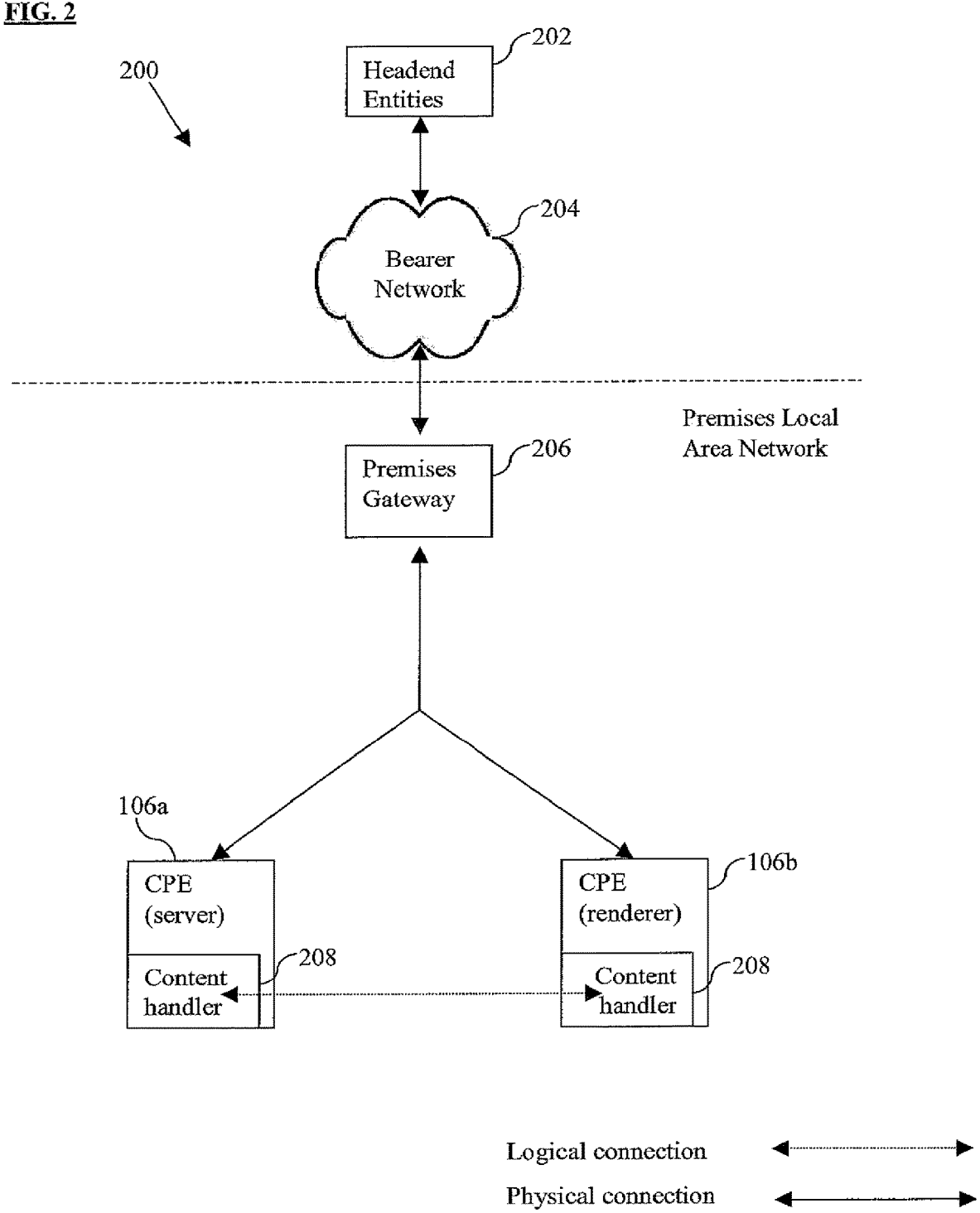

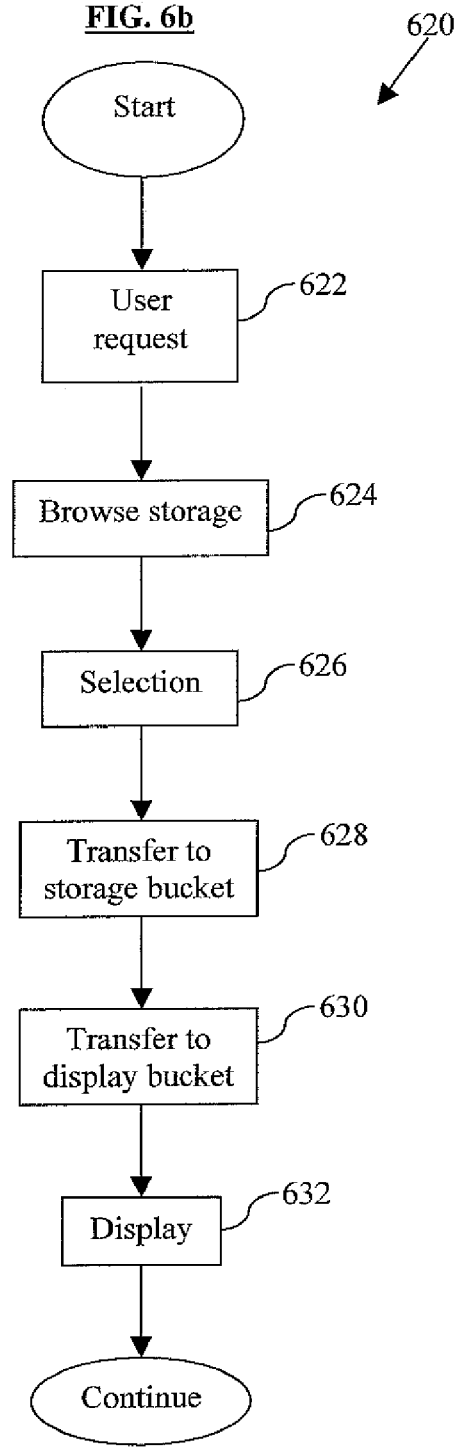

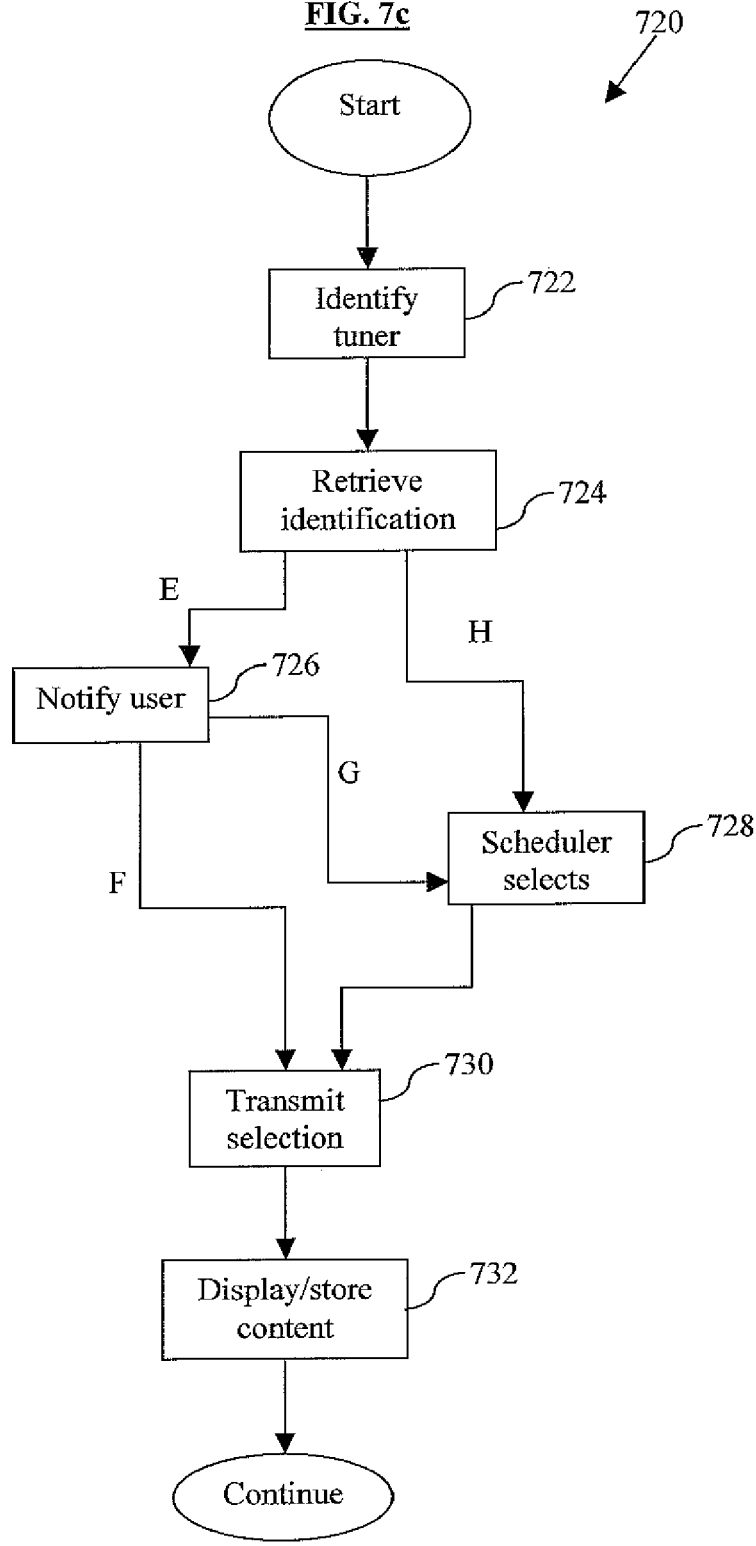

METHODS AND APPARATUS FOR PREMISES CONTENT DISTRIBUTION

PRIORITY

This application is a continuation of and claims priority to U.S. patent application Ser. No. 12/480,591 filed Jun. 8, 2009 and entitled "METHODS AND APPARATUS FOR PREMISES CONTENT DISTRIBUTION", which issued as U.S. Pat. No. 9,866,609 on Jan. 9, 2018.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content (e.g., multimedia, audiovisual, data, applications, etc.) delivery over a network. Specifically, in one aspect, the invention relates to the methods and apparatus for delivering content among a variety of devices of a network in communication with one another.

2. Description of Related Technology

Recent advances in digital information processing have made a wide range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high-speed Internet access and IP-based telephony (e.g., VoIP). Other services available to network users include access to and recording of digital music (e.g., MP3 files), as well local area networking (including wireline and wireless local area networks) for distributing these services throughout the user's premises, and beyond.

Increased deployment of wireless interfaces such as Wi-Fi, Wi-MAX and Bluetooth have also increased the prevalence and opportunity for ad hoc networking; i.e., substantially spontaneous or flexible network topologies between as few as two different entities.

Currently, many of these services are provided and delivered to the user via a wide variety of different equipment environments including, inter alia, cable modems, Wi-Fi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

Some improvements in digital service integration have been made over time. For example, cable system subscribers (such as those of the Assignee hereof) can now access VOD, PVR, PPV and broadcast services simultaneously, as well an Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is often quite limited.

Furthermore, various mechanisms for the secure movement of content delivered by these services within the user's premises (or even outside) have been employed, including, inter alia, conditional access, encryption, the establishment of trusted domains, and digital rights management. However, methods for managing and transferring data inside and outside of a user's premises to date have required the assistance of one or more separate entities; i.e., entities separate from the premises devices themselves.

Thus, improved apparatus and methods for facilitating the distribution of digital content within a user premises are needed. These would advantageously manage and transfer data without requiring entities separate from the serving and the requesting devices (e.g., premises devices) themselves. Such improved apparatus and methods would ideally operate substantially so as to allow ready implementation on any number of different platforms and environments in a substantially agnostic fashion, and provide users the ability to browse and transfer content between equipment with different vendor's security package implementations.

Such improved apparatus and methods would also preferably be implemented in a manner that is both substantially automated and transparent to the user, and which can leverage the capabilities of existing or planned industry-standard interface technologies such as Universal Plug and Play (UPnP) if desired.

SUMMARY OF THE INVENTION

The present invention addresses the foregoing needs by disclosing apparatus and methods useful for managing and distributing content within a premises (and beyond), including inter alia (i) storing content, (ii) detecting devices or entities in communication with a premises network, (iii) browsing content within such devices or entities; and (iv) transfer of content to and from authorized devices.

In a first aspect of the invention, a content server device is disclosed. In one embodiment, the content server device is used in a premises network, and comprises: a storage medium, the storage medium adapted to store content; and a digital processor comprising at least one computer program configured to receive and process requests for content. The computer program is adapted to: direct a search of the storage medium for the requested content; and direct a transfer of the requested content.

In one variant, the request for content comprises a request from a requesting customer premises equipment (CPE) and the direction a transfer of the requested content comprises directing a transfer of the content to the requesting CPE. In another variant, the request for content comprises a request from a user of the content server device.

In yet another variant, the content server device further comprises an authentication apparatus, the authentication apparatus adapted to facilitate authentication of the content-requesting entity and authorization of the requested content.

In still another variant, the content server device further comprises a receiving apparatus, the receiving apparatus adapted to receive content from one or more content servers on the network. The receiving apparatus may also comprise a display apparatus.

In a second aspect of the invention, a method of managing content is disclosed. In one embodiment, the method of managing content is used within a content server device, and comprises: directing browsing of the content by a user; processing a request for the content; and directing a transfer of the at least portion of the content.

In one variant, the act of directing browsing comprises browsing of content presently available to the content server device which is stored on the content server device, stored on a headend entity to which the content server device has access, or received to the content server device via an RF tuner disposed on the content server device. In another variant, the direction of browsing comprises browsing a schedule of content which will be available at some future time to the content server device, and the direction of a transfer of at least a portion of the content comprising waiting until the future content becomes available.

In still another variant, the direction of a transfer comprises directing a transfer of the content to a storage apparatus or to a display apparatus.

In yet another variant, the method further comprises verifying that the requesting device comprises adequate security provisions for protecting the requested content before the transferring is commenced.

In a third aspect of the invention, a content requesting device is disclosed. In one embodiment, the content requesting device is configured for data communication with a content server device over a premises network, and the device comprises: a receiving apparatus, the receiving apparatus adapted to receive content from the server device; and a digital processor comprising at least one computer program. The computer program is adapted to: direct a request for content from the server device; direct a search of a storage medium associated with the server device for the requested content; and direct a transfer of the requested content.

In one variant, the content requesting device further comprises a storage medium adapted to store the requested content, and the direction of a transfer of the requested content comprises directing a transfer to the storage medium.

In another variant, the content requesting device further comprises a display apparatus adapted to display the requested content, and the act of direction of a transfer of the requested content comprises directing a transfer to the display apparatus.

In still another variant the content requesting device further comprises a scanning apparatus, the scanning apparatus being configured to locate one or more content server devices on the network.

In yet another variant, the content requesting device further comprises a software security architecture adapted to protect at least portions of the content after it is transferred to the rendering apparatus.

In still yet another variant, the stored content comprises a plurality of media files each having a respective substantially unique title.

In a fourth aspect of the invention, a method of transferring content is disclosed. In one embodiment, the method is used for transferring content between two devices associated with a network, and comprises: storing the content at a first of the two devices; directing browsing of stored content by a requesting device; receiving a request for transmission of at least a portion of the content; and directing a transfer of the at least portion of the content to the requesting device while maintaining the content protection.

In one variant, the method further comprises authenticating the requesting device, the authentication being accomplished by the computer program running on at least one of the two devices.

In another variant, the stored content comprises a plurality of media files each having a respective substantially unique title, and the browsing comprises searching the titles.

In yet another variant, the requesting device comprises adequate security provisions for protecting the requested content before the transferring is commenced. For example, the first and second devices may comprise an authorized service domain (ASD) for maintaining protection of the content.

In still yet another variant, the first and second devices are in data communication with one another via a substantially standardized communications interface (e.g., a Universal Plug and Play (UPnP) interface), and the first device completes the authentication using a substantially standardized security architecture.

In a fifth aspect of the invention, a method of sharing content is disclosed. In one embodiment, the method is used for sharing protected content within an ad hoc network, and comprises: establishing ad hoc a communication channel between first and second entities, at least the first and second entities forming the network when the channel is established; selectively allowing at least one of the entities to browse content of the other of the entity, the browsing directed at least in part by a computer program adapted to run on at least one of the entities; receiving at one of the entities a request for at least portion of the content from the other entity; and selectively transferring at least a portion of the content from at least one of the entities to the other of the entities, the transferring being directed at least in part by the computer program adapted to run on at least one of the entities.

In one variant, the browsed content comprises content stored on the browsed entity.

In another variant, the browsing comprises viewing a schedule of the future content, and wherein the browsed content comprises content which will be available to the browsed entity at some time in the future.

In yet another variant, the method further comprises the browsed entity notifying the other entity when the content available to the browsed entity at some time in the future becomes available.

In another variant, the act of transferring at least a portion of the content comprises transferring at least a portion of the co the method further comprises authenticating content to a storage medium or a display apparatus.

In still another variant, the method further comprises authenticating at least one of: (i) the first entity to the second entity, or (ii) the second entity to the first entity. Authentication is accomplished by the computer program adapted to run on at least one of the entities, and the transfer of at least a portion of the content may be based, at least in part, on the authentication.

In yet another variant, the act of establishing comprises causing the first and second entities to be placed in data communication via at least a plug-and-play data interface.

In still yet another variant, the act of establishing comprises causing the first and second entities to be placed in data communication via a wireless interface wherein one of the first and second entities assumes a first role and the second entity assumes a second role with respect to the communication channel. The first role may comprise a master station, and the second role a slave station. For example, the first role may comprise an access point (AP), and the second role may comprise a station (STA), the AP providing data connectivity to at least one other entity other than the STA.

In a sixth aspect of the invention, a computer readable apparatus is disclosed. In one embodiment, the computer readable apparatus comprises media adapted to contain a computer program having a plurality of instructions, the plurality of instructions which, when executed: process requests for content; direct browsing of available content; and direct a transfer of the requested content.

In one variant, the computer program is run on a first device, the requests for content comprise requests from the first device, or a second device, and the available content comprises content stored on the first device.

In another variant, the computer program is further adapted to receive content over a network interface, and wherein the available content comprises content received from the interface. The network interface may comprise at least one RF tuner. The computer program may be run on a first device, and the requests for content may comprise requests from the first device, or a second device, for content received from the interface. The available content may comprise content available at some future time, the computer program further adapted to maintain the requests for the content available at some future time and implement the requests at some time after the future time when the content becomes available.

In yet another variant, the computer program is run on a first device, the requests for content comprise requests from the first device, and a transfer of the requested content to a storage apparatus or a display apparatus associated with the first device is performed.

In still another variant, the computer program is run on a first device, the requests for content comprise requests from a second device. A transfer is directed to a storage apparatus or a display apparatus associated with the second device.

In a seventh aspect of the invention, a first computerized user device configured for role-switching between server device role and a renderer device role is disclosed. In one embodiment, the first computerized user is configured for data communication with a second computerized user device via an ad hoc network, and includes: a data communication interface configured for data communication with at least second computerized user device via the ad hoc network; data storage apparatus; and processor apparatus configured for data communication with the data communication interface and the data storage apparatus, the storage apparatus having at least one computer program stored thereon. The computer program comprises a plurality of instructions which are configured to, when executed by the processor apparatus, cause the first computerized user device to: receive data indicative of a first user request to access content, the first user request comprising a request to access, via the first computerized user device, first digital content available at the second computerized user device; based at least on the data indicative of the first user request, cause the first computerized user device to assume the renderer device role; receive data indicative of a second user request to access content, the second user request comprising a request to access, via the second computerized user device, second digital content available at the first computerized user device; and based at least on the data indicative of the second user request, cause the first computerized user device to assume the server device role.

In an eighth aspect of the invention, a method of sharing protected digital content within a premises data network is disclosed. In one embodiment, the method includes establishing a communication channel between a first computerized entity and one or more other computerized entities, the first computerized entity and the one or more other computerized entities forming the premises data network; and selectively enabling role-switching of the first computerized entity between at least (i) a server device role and (ii) a renderer device role, each of the server device role and the renderer device role implemented for the sharing of the protected digital content with the one or more other computerized entities, the protected digital content comprising at least first digital content and second digital content.

These and other aspects of the invention shall become apparent when considered in light of the disclosure provided herein.

BRIEF DESCRIPTION OF THE DRAWINGS

FIG. 2 is a graphical representation of generalized network architecture implementing various devices having improved content distribution according to the present invention.

FIG. 6b is a logical flow diagram of another exemplary method of content transfer utilizing a content handler, according to the present invention, which is adapted to access content stored on the CPE itself.

FIG. 7c is a logical flow diagram illustrating an exemplary method of resolving contention issues utilizing a content handler, according to the present invention.

DETAILED DESCRIPTION OF THE INVENTION

Figure 1:
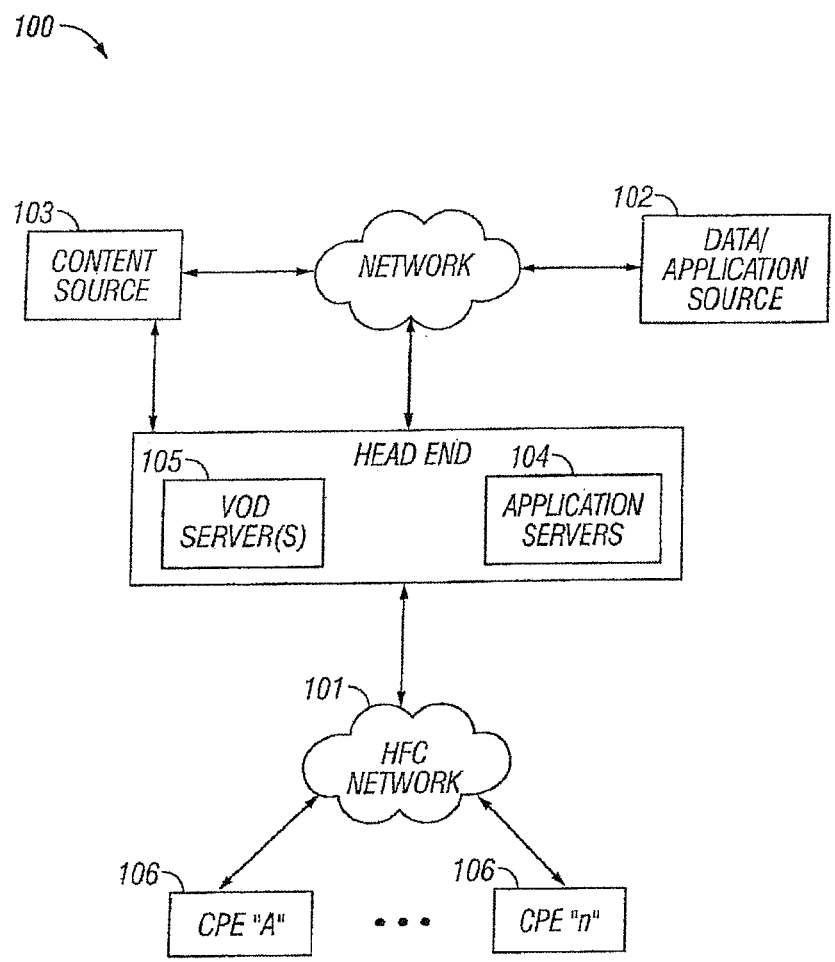
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (Real Video, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally and without limitation to a terminal device that has access to digital television content via a satellite, cable, or terrestrial network. The host device functionality may be integrated into a digital television (DTV) set. The term "customer premises equipment" (CPE) includes without limitation electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateways or gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the terms "render" and "renderer" refer to any device, process or entity which utilizes content for, without limitation, display, execution, or playback. For example, a renderer might comprise a DVR, television monitor, PC, mobile device with display capability, laptop computer, iPod or even an MP3 player.

As used herein, the terms "security framework" and "security package" refer generally to, without limitation, one of more of implementation guidelines, security policies, application programming interfaces (APIs), encryption or scrambling algorithms, and cryptographic element (e.g., symmetric or asymmetric key) generation and management algorithms.

As used herein, the term "server" refers to any computerized component, system or entity regardless of form which is adapted to provide data, files, applications, content, or other services to one or more other devices or entities on a computer network.

As used herein, the terms "PnP" and "Plug and Play" refer generally to a capability wherein devices can communicate when first placed in communication according to a substantially known or standardized capability. Such communication is generally without requiring reconfiguration or manual installation of device drivers. One exemplary embodiment of such PnP capability is the Universal PnP (UPnP) technology set forth in "UPnP™ Device Architecture" Version 1.0, dated Jun. 8, 2000, incorporated herein by reference in its entirety.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/i/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, Wi-MAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides apparatus and methods for the management of content within a single device and for several devices connected to a home network to transfer protected content (including for example audiovisual or multimedia content, applications or data) in a substantially "peer-to-peer" fashion and without resort to a central security server or other such entity. The management, transfer, and "browsing" of content on a single device or on a plurality of devices is accomplished via a content handler which, in one embodiment, is an application run on at least one of the devices and adapted to sit between the OCAP digital navigator and OCAP stack. The content handler utilizes various algorithms in conjunction with several "buckets" to make management, transfer, and browsing possible.

In one exemplary embodiment, the content handler is disposed on a server device and directs the browsing of stored and other available content as well as the transfer of selected content within the device itself and to other devices. It is noted that the server device may comprise a CPE, host device, or other entity, including, inter alia, a VOD server or PVR entity. The content handler of the present embodiment may also include authentication functionality to ensure transfer between authorized devices. Further, the content handler may also comprise a scheduler adapted to maintain a schedule of upcoming content (i.e. content that will be available at a future time), and manage tuner resources including scheduling the resources for receipt of future content.

In another exemplary embodiment, the content handler is disposed on a requesting device; the content handler of this embodiment is adapted to direct requests to server devices (including, e.g. CPE, VOD servers, PVR entities), directs searches of the server devices, and direct transfers from server devices to the various components of the CPE on which the content handler is present.

Methods for transfer of content within a device utilizing a content handler as well as methods for the transfer of content between two devices, where at least one device utilizes a content handler are also described.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Further, it is noted that, while the present discussion is given in terms of traditional CPE (i.e., devices which receive content from traditional RF tuner interfaces), other devices may be utilized in conjunction with the present invention as well. For example, in one embodiment, one or more of the server and/or renderer devices may comprise an IP video device (IVD); an IVD is a device which receives video stream from an IP connection (rather than RF connection). Exemplary IVD may include, inter alia, IP STB's, cellular telephones, laptops, general purpose PC's, gaming consoles, etc.

Further, it is appreciated that while described generally in the context of the OpenCable Application Platform (OCAP) operating system, other systems including, inter alia, MHP, ARIB, ACAP or proprietary may be utilized consistent with the present invention.

Lastly, it is recognized that while described primarily in the context of a consumer or enterprise premises having a prescribed geographic scope or boundaries, the invention is in no way limited to any such premises description. For example, a "premises" as used herein could refer to a psychologically proximate premises; e.g., a group of entities or locations that are not physically proximate, but rather logically proximate with respect to a user, such as that user's home, office, and car. Similarly, a "premises" could refer to psychologically proximate devices irrespective of their physical location (e.g., "my cellular phone", "my DVR", etc.), or even psychologically proximate users ("my girlfriend", "my mother", "my boss", etc.) again irrespective of their location.

Content Delivery Network—

FIG. 1 illustrates a typical content-based network configuration with which the premises content distribution apparatus and methods of the present invention may be used. As will be described in greater detail subsequently herein, the premises content distribution apparatus and methods of the invention are advantageously both independent of and agnostic to the delivery mode for the content; hence, the following discussion regarding cable network architectures is purely illustrative of one of many possible delivery modalities for content. Moreover, the present invention is independent of the delivery paradigm used within the network to deliver the content (i.e., broadcast, session-based, etc.).

The various components of the exemplary content delivery network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for clarity, although it will be recognized that comparable architectures with multiple origination points, distribution servers, VOD servers, and/or CPE devices (as well as different network topologies) may be utilized consistent with the invention. For example, the headend architecture of FIG. 1*a* (described in greater detail below) may be used.

The data/application origination point 102 comprises any medium that allows data and/or applications (such as a VOD-based or "Watch TV" application, or other application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network agent or entity. Exemplary embodiments of the CPE of the invention are described subsequently herein with respect to FIGS. 3, 5, 7*a* and 7*b*. It may also include a network server, as described subsequently herein.

Figure 1A:
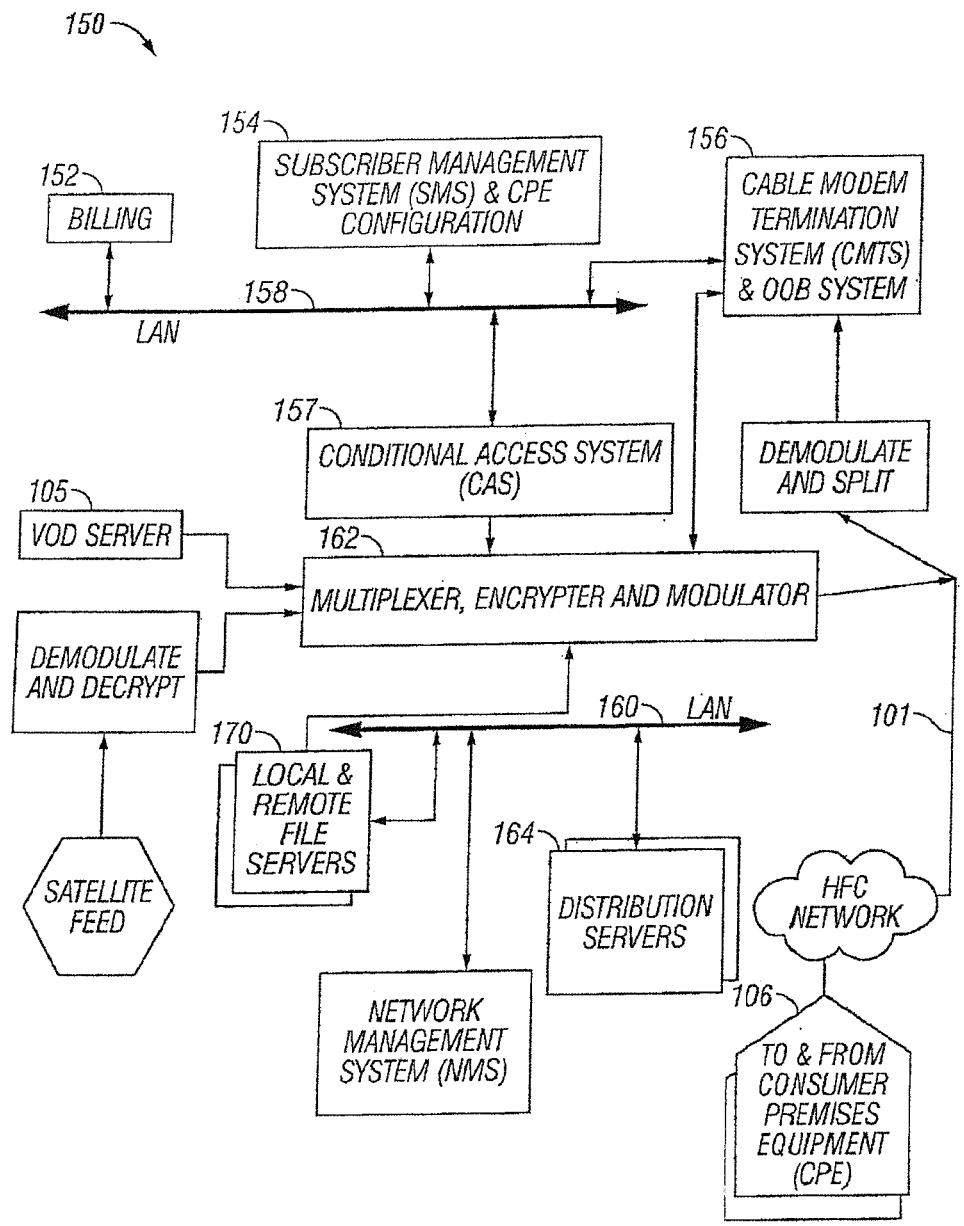
FIG. 1a is a functional block diagram illustrating one exemplary HFC cable network headend configuration useful with the present invention.

Referring now to FIG. 1*a*, one exemplary embodiment of network headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It is also noted that the headend configuration depicted in FIG. 1*a* is high-level, conceptual architecture and that each MSO may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

A digital rights management (DRM) server, not shown, may also reside at the headend 150, and used for serving DRM requests from downstream devices such as the CPE 106. The exemplary DRM server comprises a computer system where the security and encryption aspects of content transferred over the network 101 are managed. The content servers described above may implement encryption and CA technology in conjunction with the DRM server such that the content made available over the network can be received and decoded by specific CPE 106 only.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
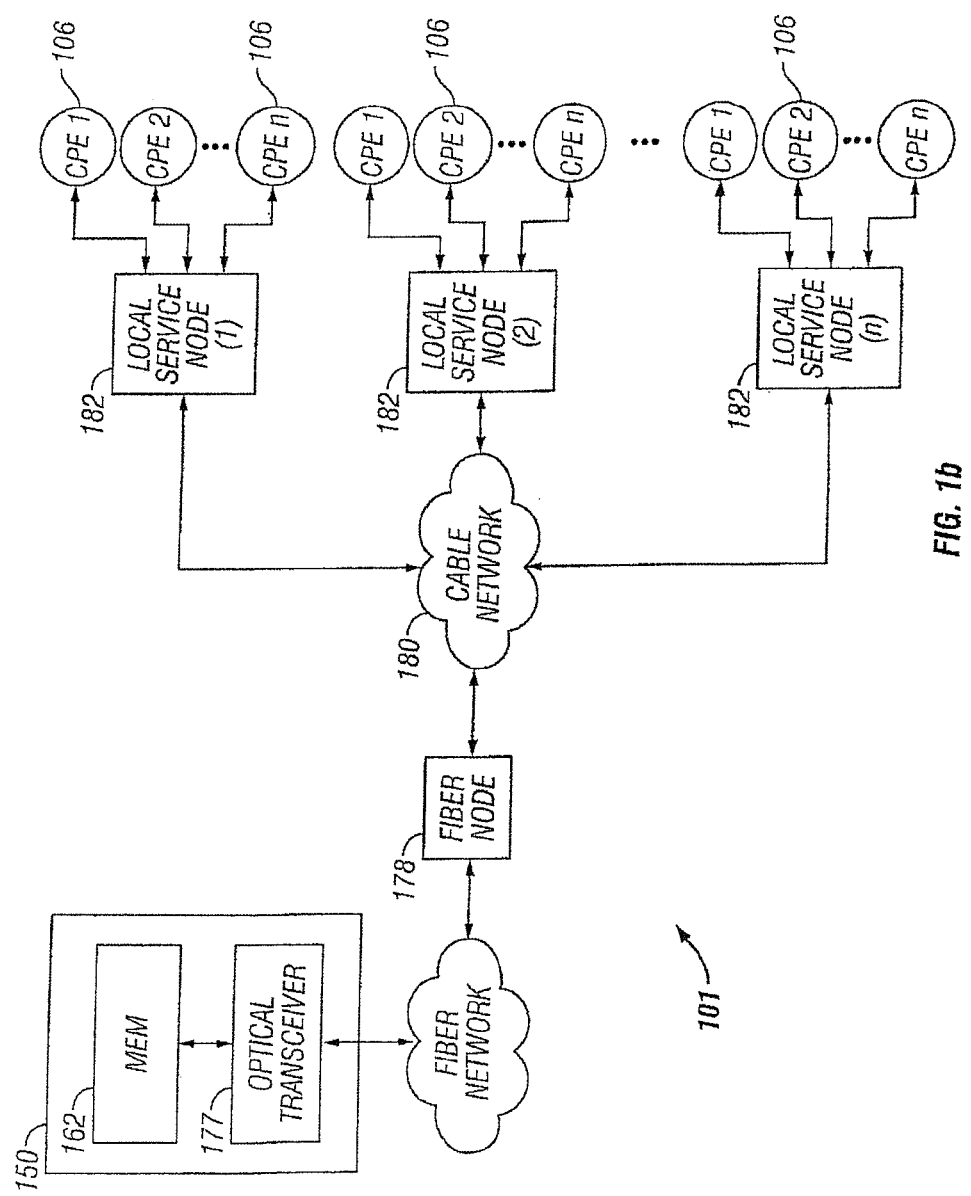
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
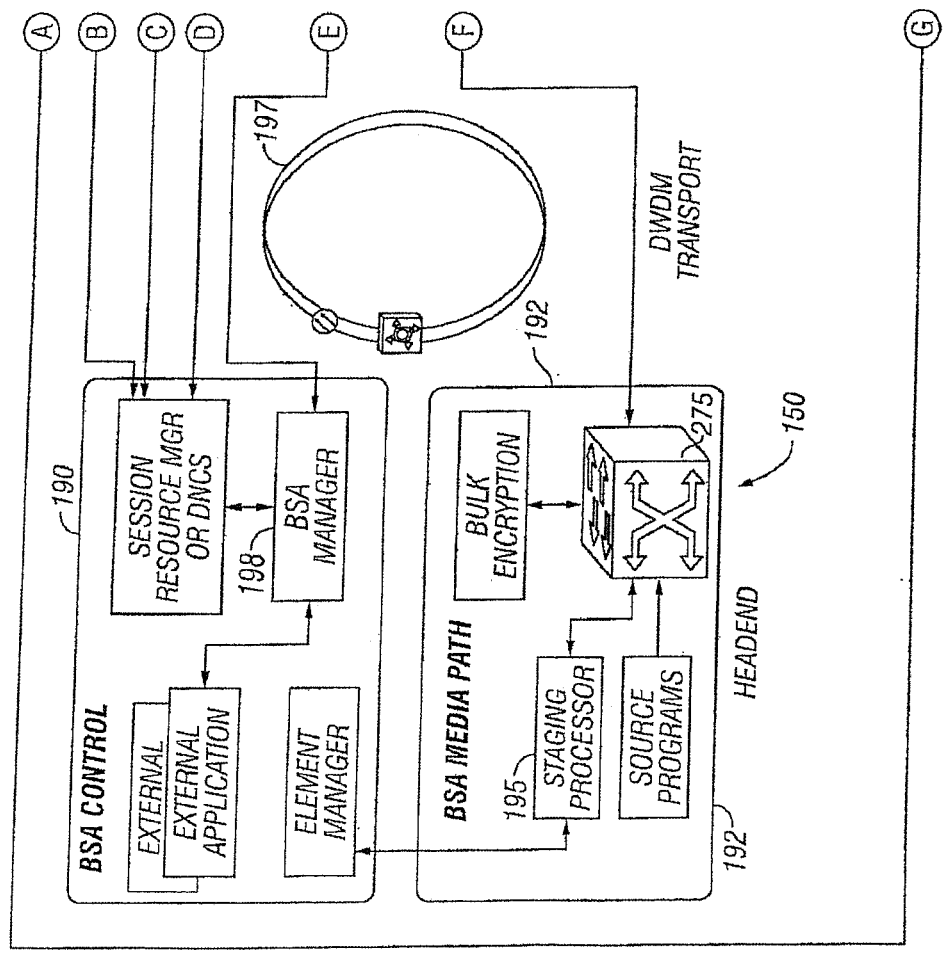
FIG. 1c is a functional block diagram illustrating one exemplary broadcast switched architecture (BSA) network useful with the present invention.
Figure 1C:
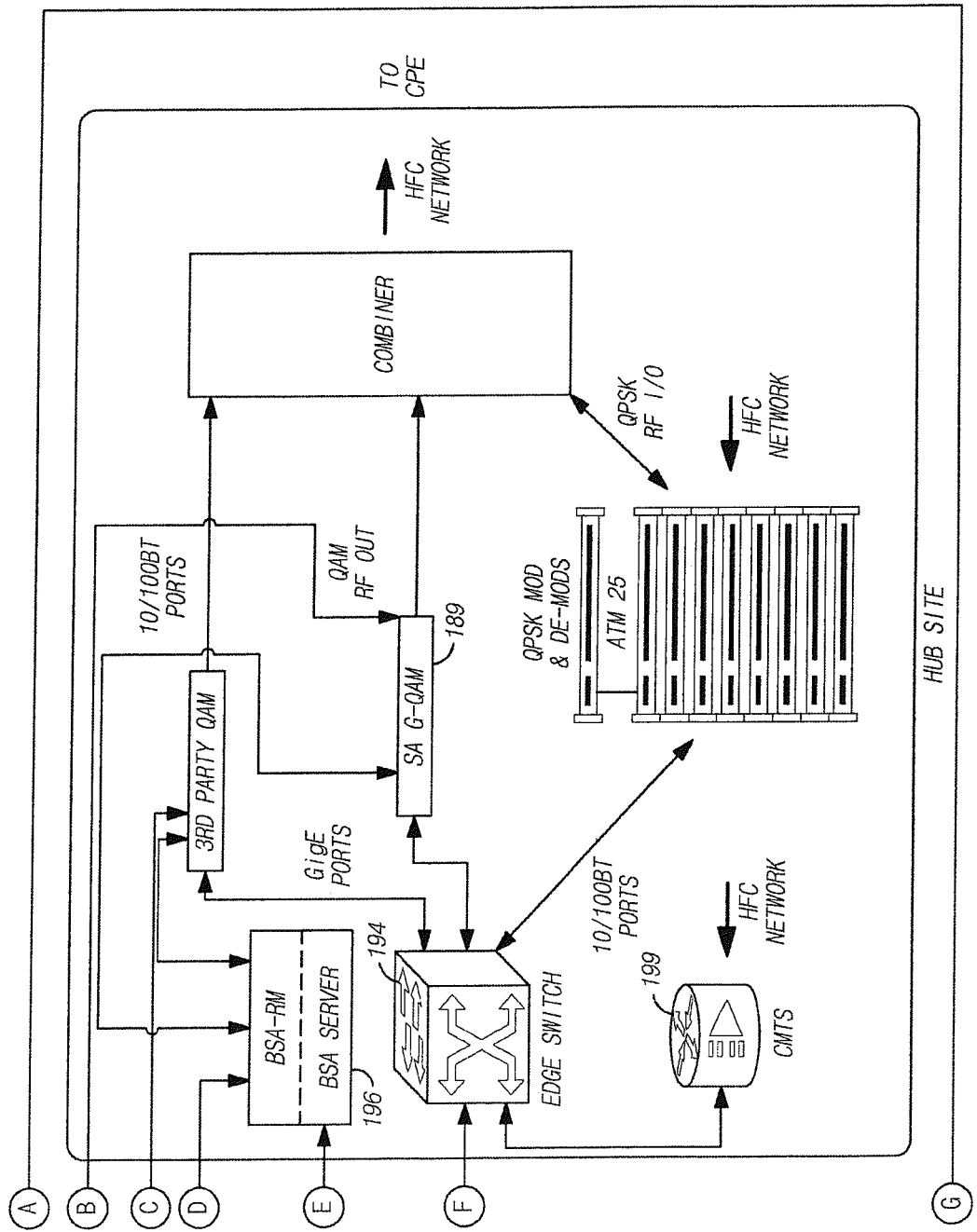

FIG. 1c illustrates exemplary "switched" network architecture also useful with the premises content distribution architecture and methods of the present invention. While a so-called "broadcast switched architecture" or BSA network is illustrated in this exemplary embodiment, the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique for effectively providing program material in a cable television system", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device (e.g., converged device, as discussed subsequently herein) for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Co-pending U.S. patent application Ser. No. 11/013,665 filed Dec. 15, 2004, entitled "Method and apparatus for high bandwidth data transmission in content-based networks", and issued as U.S. Pat. No. 8,522,293 on Aug. 27, 2013, incorporated herein by reference in its entirety, describes yet another delivery model for the aforementioned content, based on a high-speed VOD-based infrastructure.

It will be appreciated that the content delivery network used with the premises distribution functions of the present invention may also include a downloadable conditional access (CA), DRM, or trusted domain (TD) apparatus such as those described in co-pending and co-owned U.S. patent application Ser. No. 11/584,208 filed Oct. 20, 2006, entitled "Downloadable security and protection methods and apparatus", and issued as U.S. Pat. No. 8,520,850 on Aug. 27, 2013, incorporated herein by reference in its entirety. Such download apparatus is useful at, inter alia, the headend or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network. In one embodiment, these capabilities comprise downloadable personalized software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments referenced above allow for the download of secure software images, which may be used to, inter alia, ensure security of the downloaded images and also migrate protected content to other platforms in the user or client domain so as to extend the trusted or authorized service domain. Advantageously, outside of the conditional access system (CAS), the personalized software image is never rendered in an unprotected form or otherwise made accessible.

Premises Content Distribution System—

Referring now to FIG. 2, an exemplary embodiment of a premise content distribution system 200 according to the invention is described in detail. A simple architecture comprising one of each of the aforementioned components is shown in FIG. 2 for clarity, although it will be recognized that comparable architectures with multiple components, as well as different network topologies, may be utilized consistent with the present invention.

As shown in FIG. 2, the exemplary content distribution system 200 comprises a plurality of components in communication with one another. The various components directly or indirectly communicating may include (i) one or more Premises Gateways 206, (ii) one or more "server" consumer premises equipment (CPE) 106a functioning as a content source or server, and (iii) one or more "renderer" CPE 106b functioning as a renderer of content. It will be appreciated that a single device or entity may also switch roles (i.e., from server to renderer, or vice-versa), and may carry out both functions (i.e., server and renderer), albeit not necessarily for the same process or thread. Moreover, role switching can occur as part of the underlying transport or PHY functions (e.g., a Wi-Fi AP/STA role switch, or Bluetooth Master/Slave role switch) while the server-renderer functions described herein are preserved.

The premises gateway 206 includes a hardware platform that is generally installed either inside or outside of the premises. The premises gateway 206 platform is connected to the bearer network 204 (e.g., HFC 101, satellite network, Telco DSL network, etc.) via an appropriate interface such as a coaxial cable or DOCSIS connection, a digital subscriber line (DSL) telephony connection, an Internet Protocol Television (IPTV) connection over copper wire, a satellite receiver coupled to an antenna, etc. The premises gateway 206 is also connected on its back end to other equipment that is installed in the premises (not shown). In one embodiment, the premises gateway 206 is connected to the other premises equipment via a premises local area network, or PLAN, interface such as that described in co-owned U.S. patent application Ser. No. 11/592,054 entitled "Methods and apparatus for premises content distribution" and issued as U.S. Pat. No. 8,732,854 on May 20, 2014, which is hereby incorporated by reference in its entirety.

The connection of the premises gateway to the other premises equipment may take literally any form, whether wired or wireless, including, inter alia a 10/100/1000/10-Gig-E NIC, a Wi-Fi interface card, or a coaxial RF interface, or any other mechanism known in the art.

In some implementations, the premises gateway 206 might be connected to more than one bearer network, and/or may have multiple various connections to various PLAN (not shown) or CPE 106. For example, a premises gateway 206 may be connected to some devices over a wireless connection and other devices over a wired connection such as a telephone line, power line, or indigenous coaxial cable.

The present invention accordingly contemplates various implementations of the premises gateway functionality. For example, one exemplary converged device useful with the present invention is described in co-owned U.S. patent application Ser. No. 11/378,129 filed Mar. 16, 2006, entitled "Methods and apparatus for centralized content and data delivery", and issued as U.S. Pat. No. 8,347,341 on Jan. 1, 2013, incorporated herein by reference in its entirety, although it will be recognized by those of ordinary skill that other devices and approaches may be substituted.

In the illustrated embodiment, the present invention utilizes at least two CPE 106a, 106b in communication with one another. One of the CPE 106a functions as a content server, while the other CPE 106b functions as a content renderer. The server CPE 106a therefore functions to store content. The content can be stored using one or more storage media such as a hard drive (HDD), flash memory card or USB key, optical disc, memory array, RAID, etc. The storage may be present "in the box", or may comprise an attached external device 210 attached to the server CPE 106a via a dedicated or shared connection. It is appreciated that in one embodiment, the content server CPE 106a and the premises gateway 206 may be implemented on the same physical platform. In such as case, the content server/premises gateway might take the form of, e.g., a DVR or a multi-room DVR device that interfaces to one or more distribution networks 101. It may also comprise one or more high-speed interfaces (e.g., USB 2.0, IEEE-Std. 1394 "Firewire", etc.) over which plug-and-play functionality may be implemented. Further, as noted above, the functions of the content server CPE 106a may also be implemented by the renderer CPE 106b. It is also appreciated that, in other embodiments, the content server CPE 106a may comprise a headend entity such as a VOD server 105, or network PVR; or BSA hub entity.

Both CPE 106a, 106b of the illustrated embodiment comprise a hardware/software platform including a content handler 208, which will be discussed in greater detail below. However, it is appreciated that in alternative embodiments, only one CPE 106 comprises a content handler 208. Generally, the content handler 208 permits the content server CPE 106a and the content renderer CPE 106b to be in communication with one another to send and receive content between them. The content handler 208 is also adapted to communicate with the resource manager (not shown), content manager (not shown), and other components of the CPE 106, as well as other components of other CPE 106 which do not have content handlers 208 of their own. According to this embodiment, the CPE 106 having a content handler 208 would still be adapted to send and receive content to and from a legacy device (a CPE 106 which does not have a content handler 208) as well as other network components.

Similarly, the content server CPE 106*a* may merely act as a proxy for an upstream device connected to multiple distribution networks. One such device is disclosed in a co-owned U.S. patent application Ser. No. 11/440,490 filed May 24, 2006, entitled "Personal content server apparatus and methods", and issued as U.S. Pat. No. 8,280,982 on Oct. 2, 2012, incorporated herein by reference in its entirety. In one embodiment, the device comprises a personal content server located, e.g., at the headend of the bearer (cable) network or at a BSA switching hub; this server distributes content to the remote requesting location(s), thereby eliminating repetitious traffic to and from subscriber's premises to fulfill the requests for remote content delivery.

It will be appreciated that the present invention can also be used in a complementary or layered fashion with other content acquisition, management and control technologies. For example, the methods and apparatus described in co-owned U.S. patent application Ser. No. 11/080,693 filed Mar. 14, 2005 entitled "Method and apparatus for network content downloading and recording", and issued as U.S. Pat. No. 8,028,322 on Sep. 27, 2011, incorporated herein by reference in its entirety, may be used consistent with the present invention to provide network users with the ability to purchase and record content to a physical medium, while also obeying the security policies imposed by the relevant security architecture (e.g., TD or ASD).

CPE Architecture—

Figure 3:
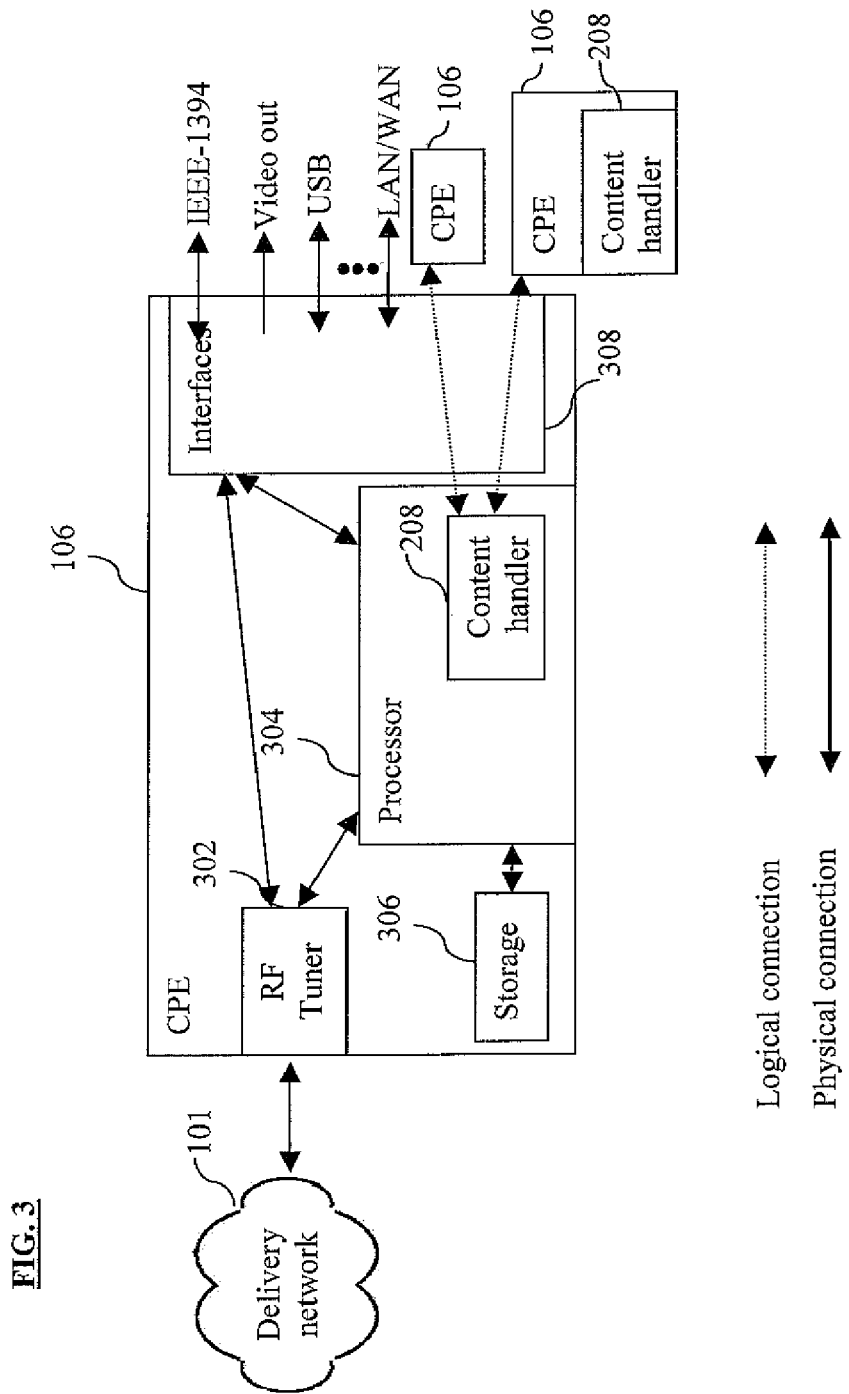
FIG. 3 is a functional block diagram of an exemplary embodiment of a consumer premises or client device implementing the content handler of the present invention.

Referring now to FIG. 3, one exemplary embodiment of a server or renderer CPE 106*a*, 106*b* according to the present invention is described. As previously noted, server CPE 106*a* or render CPE 106*b* can be identical, and even perform both functions (i.e., serving content and rendering content at different times, or at the same time for different processes/threads); thus will be collectively and generally referred to as CPE 106.

As shown in the simplified diagram of FIG. 3, the device 106 generally comprises a computerized system (e.g., embedded DSTB, converged premises device, etc.) having an RF tuner 302 for interface with the delivery network 101 (or any interposed gateway devices) of FIG. 2, digital processor(s) 304, storage device 306, and a plurality of interfaces 308 (e.g., video/audio interfaces, IEEE-1394 "Firewire", USB, serial/parallel ports, etc.) for interface with other end-user apparatus such as televisions, personal electronics, computers, Wi-Fi or other network hubs/routers, etc. It is appreciated that although only one tuner 302 is depicted, other embodiments of the present invention may comprise more than one tuner 302 or a wideband or ultra-wideband tuner consistent with the present invention.

Other components which may be utilized within the device (deleted from FIG. 3*a* for simplicity) include various processing layers (e.g., DOCSIS MAC or DAVIC OOB channel, MPEG, etc.) as well as media processors and other specialized SoC or ASIC devices. A separate cable modem (e.g., DOCSIS) tuner may also be included for receiving downstream cable modem signals over the coaxial cable. The CPE 106*a* may also comprise an integrated HD decoder, thereby relieving any connected monitors or other devices from the requirement of having such a decoder. These additional components and functionality are well known to those of ordinary skill in the cable and embedded system fields, and accordingly not described further herein.

Alternatively, the CPE 106 may comprise a "head-less" configuration, wherein the only user interaction with the device occurs over a network connection; e.g., in a PVR-like fashion.

The CPE 106 of FIG. 3 is also adapted include a content handler 208. The content handler 208 is an OCAP-compliant Java-based middleware application which, inter alia, manages the operation of the device 106 and other applications running thereon. The software architecture of the content handler 208 is discussed in further detail below.

It will be recognized by those of ordinary skill that myriad different device and software architectures may be used consistent with the tuning and channel request functions of the present invention, the device of FIG. 3 being merely exemplary. For example, different middleware (e.g., MHP ARIB, ACAP or proprietary) may be used in place of the OCAP middleware of the illustrated embodiment.

Likewise, the content handler 208 of the CPE 106 may contain application layer programs which allow interactivity with other devices 106 on the network. Because the content handler 208 is OCAP compliant, the content handler 208 of the present invention may be adapted to communicate and interact with the content handler 208 of another CPE 106, or with the resource manager (not shown) or other entity present on another CPE 106 via the other entity's OCAP system. It is appreciated that a variety of protocols may be utilized to effectuate such communication. In one embodiment, the communication protocol is Internet Protocol based. Examples of such programs include UPnP application, a program guide, and so on. The content handler 208 may be implemented such that a user can control a renderer CPE 106*b* "directly" or "over the network." The direct control to a user may be in the form of a remote control, control switches and buttons (e.g., volume control knob). When the renderer CPE 106*b* is controlled "over the network", a user may be able to configure the device by accessing its controls via a network connection and content handler 208 present in one or both CPE 106. In one embodiment, one network may be used for accessing and controlling the device 106*b*; in another embodiment, a separate network may be used for accessing and controlling respectively. However, in a preferred embodiment, the same network is used to achieve both tasks, such as for example the PLAN network of previously incorporated U.S. application Ser. No. 11/592,054.

The exemplary content handler 208 of the present invention may also further comprise a personal media application, which allows a user to manage his personal media tasks. Such management includes, but is not limited to, the ability to browse through programs stored locally or on a server to see which programs are available for viewing. Previewing and similar extended "browsing" functionality may also be provided. In the virtual PVR or network PVR scenarios described elsewhere herein, such programming or content may be stored on a server located at the headend, with the CPE 106 acting effectively as its proxy. The personal media application may also be made responsive to a network-side application that queries the CPE to check on the program titles stored on the CPE 106.

As previously noted, either of the CPE 106*a*, 106*b* of the invention may be embodied as a multi-function or converged premises device, such as that described in co-owned U.S. patent application Ser. No. 11/378,129 filed Mar. 16, 2006 previously incorporated herein. This exemplary configuration (not shown) comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises via a content handler 208 running thereon, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment and a mechanism for the various devices 106 to communicate and interact with one another via at least one content handler 208.

In another embodiment, a wired home network utilizing existing coaxial cable in the premises is created, by using e.g., an Ethernet-to-coaxial bridge technology based on the MoCA specification. According to this embodiment, existing devices and DVRs (i.e. those not having content handlers 208) are permitted to connect and share content with a CPE 106 via a connection to its content handler 208.

In yet another embodiment, the CPE 106 is advantageously accessible via any remote device with internetworking (e.g., Internet) capability. The content handler 208 of the CPE 106 would be adapted accordingly and would thereby allow personal content to be accessed by the user from outside the premises.

Content Handler Architecture—

Figure 4A:
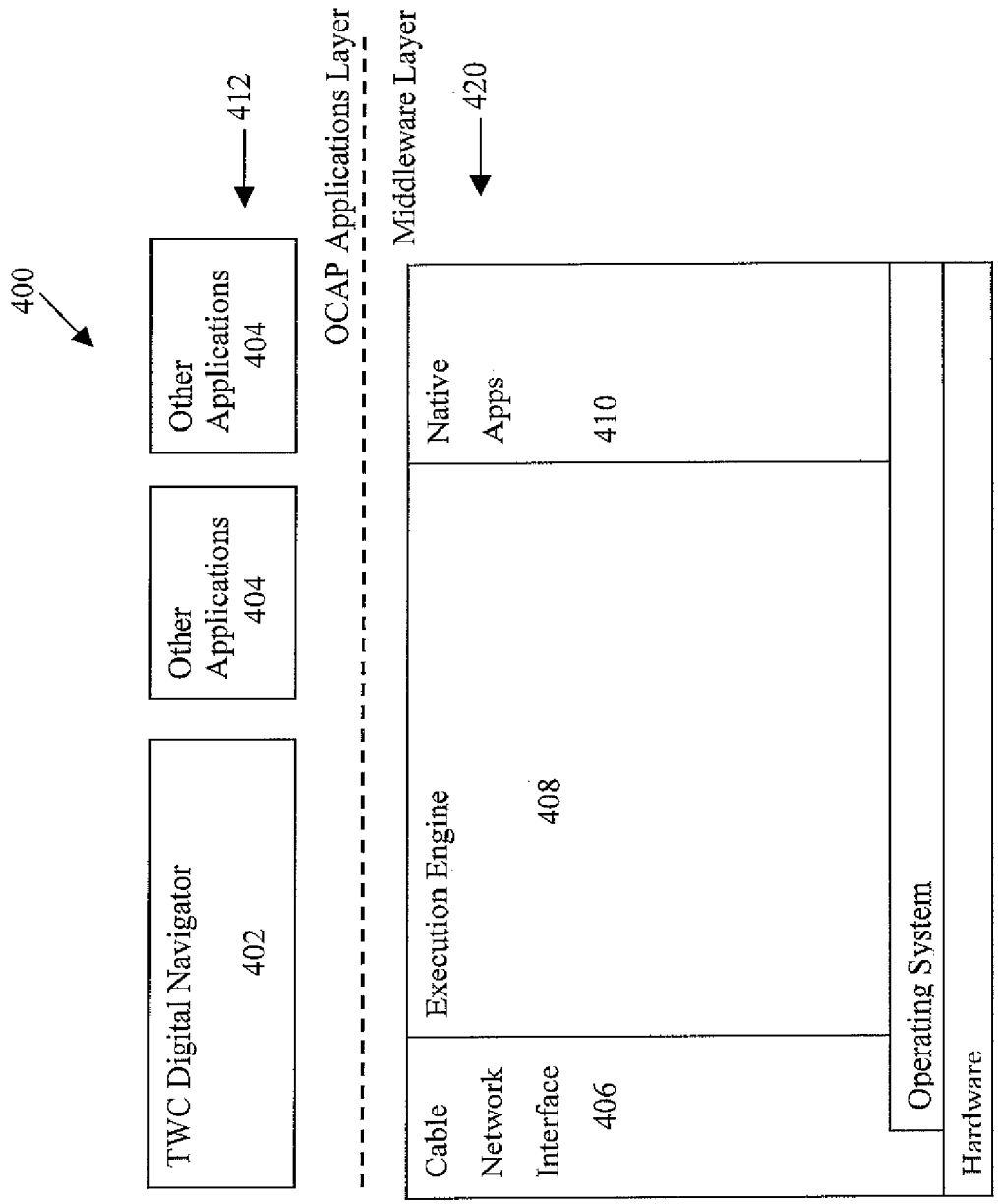
FIG. 4a is a functional block diagram of an exemplary prior art OCAP stack.

FIG. 4a is a generalized representation of the OCAP stack 400 as traditionally employed in prior art CPE 106. As illustrated, the OCAP stack 400 generally comprises an applications layer 412 and a middleware layer 420. The applications layer 412 is where various applications, bestowing various functions, are placed. The illustrated embodiment shows an applications layer 412 having a TWC OCAP Digital navigator (ODN) application 402, such as that described in co-owned U.S. patent application Ser. No. 11/607,663 entitled "Methods and apparatus for software provisioning of a network device" and issued as U.S. Pat. No. 10,104,432 on Oct. 16, 2018, which is incorporated herein by reference in its entirety; however it is appreciated that other navigators may be utilized consistent with the present invention. The applications layer also comprises a plurality of other applications 404 which may be run including, for example, a TWC Monitor, a Watch TV application, etc. The middleware layer 420 generally comprises native applications 410, a cable network interface 406, and a plurality of modules (not shown) run on an execution engine 408.

Figure 4B:
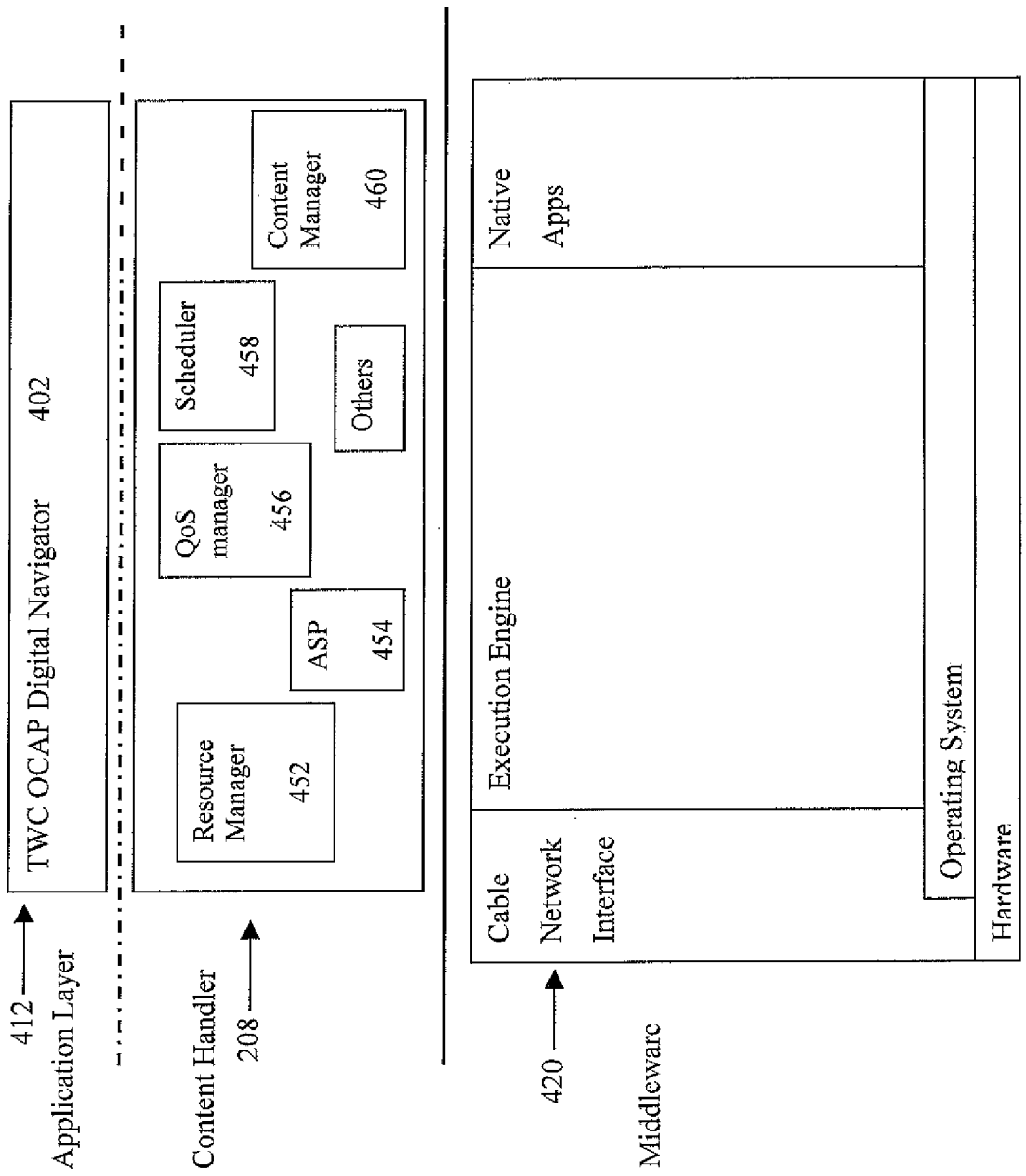
FIG. 4b is a functional block diagram of an exemplary OCAP stack of a CPE 106 implementing the content handler of the present invention.

FIG. 4b illustrates an exemplary embodiment of the OCAP stack 450 of a CPE 106 having a content handler 208 in accordance with the present invention. As illustrated, the content handler 208 sits between the OCAP digital navigator (ODN) application 402 and the OCAP middleware layer 420. As discussed above, other embodiments may utilize alternative navigation applications and/or alternative application platforms consistent with the present invention. Thus, it is appreciated that the present architecture is merely exemplary in nature and not intended to represent the only architecture for employing the content handler 208; other configurations are incorporated herein as well.

The content handler 208 comprises multiple algorithms in several buckets. The content handler 208 uses the various algorithms in conjunction with the buckets to perform various functions related to finding, selecting and transferring content. The buckets of the illustrated embodiment are associated with a resource manager 452, a QoS manager 456, an authorized service provider, ASP, 454, a scheduler 458, and a content manager 460. However, it is appreciated that buckets associated with other CPE 106 components may be incorporated consistent with the present invention. The buckets serve as intermediate locations where the various components may communicate with and transfer data with the content handler 208. The method by which the buckets are utilized will be discussed in greater detail below with regard to the functional aspects of the content handler 208.

The resource manager 452 described above as associated with the content handler 208 buckets may be similar to that described in co-owned U.S. patent application Ser. No. 12/070,560, entitled "Multi-stream premises apparatus and methods for use in a content-based network" and issued as U.S. Pat. No. 9,743,142 on Aug. 22, 2017, which is hereby incorporated by reference in its entirety. The resource manager 452 functions in the present invention to, inter alia, process and maintain information from the RF front-end and utilize the information to monitor and to control the tune of the various tuner resources of the system (which may be controlled individually), as well as to route various individual content streams to various individual receiving devices simultaneously. The resource manager 452 with which the content handler 208 is in communication may be located on the CPE 106 having the content handler 208 or on a separate CPE 106.

The resource manager 452 arbitrates the hardware resources without requiring the OCAP application to have knowledge of those resources. It hides all the resource management from the OCAP application. The OCAP application only knows that it has content available from a single resource, but under this architecture, that single resource is representative of multiple resources.

The authorized service provider (ASP) 454 associated with the content handler 208 bucket comprises any entity which is adapted to send content to the CPE 106 having the content handler 208. The ASP 454 may comprise, inter alia, an HFC network entity 101, a distribution server 104, a VOD server 105, a digital rights management server, a broadcast switch server, or an edge switch device 194 associated with a hub.

The ASP 454 is an authorization engine that determines whether the client is able to access content. Again the content handler 208 assumes that responsibility so that all of these services are transparent to the application. The ASP 454 implements policies and enforces obligations with respect to the content.

The QoS manager 456 associated with the content handler 208 bucket described above may be similar to that described in co-owned, co-pending U.S. patent application Ser. No. 12/070,666, entitled "Apparatus and methods for utilizing statistical multiplexing to ensure quality of service in a network"; which is hereby incorporated by reference in its entirety. Accordingly, the QoS manager 456 associated with the content handler 208 bucket described above would comprise a computer application adapted to run on a CPE 106 (whether separate from the CPE 106 having the content handler 208, or not) and configure/implement a QoS policy for each content stream sent to a receiving device.

The QoS manager 456 in the stack relies on the QoS manager in the content hander 208 for the policy information and conflict resolution. The QoS manager 456 is a simple QoS organizer; all of the QoS definition, conflict resolution, etc. occurs at the content handler 208.

The content manager 460 described above as associated with the content handler buckets is a management entity, whether disposed at the headend or hub of the network, for management of media content received at the network.

The content manager 460 aggregates all of the content detected from the home network (and other sources) into a single interface (DVR EXT interface for OCAP) so that there are no additional requirements for the OCAP Digital Navigator.

The scheduler 458 described above is also a management entity, however, the scheduler 458 is disposed within the CPE 106 on which the content manager 208 is disposed. As will be discussed in greater detail below, the scheduler 458 manages the tuner resources 302 of the CPE 106 and reserves disk space on a storage device for programming that is pre-set to record. Thus, the scheduler 458 is charged with complex management functions; and, when more than one tuner 302 is present, the scheduler 458 streamlines their management. It is of note that in another embodiment, the abovementioned functionality of the scheduler 458 of the present invention may be incorporated into a resource manager or other management entity present on the CPE 106 having the content handler 208. Alternatively, the scheduler 458 of the present invention may further comprise the additional functionality generally attributed to a resource manager, as discussed above. Further, the scheduler 458 with which the content handler 208 is in contact may be the scheduler 458 disposed on the same CPE 106, or may be associated with the content handler 208 of a separate CPE 106.

Figure 5:
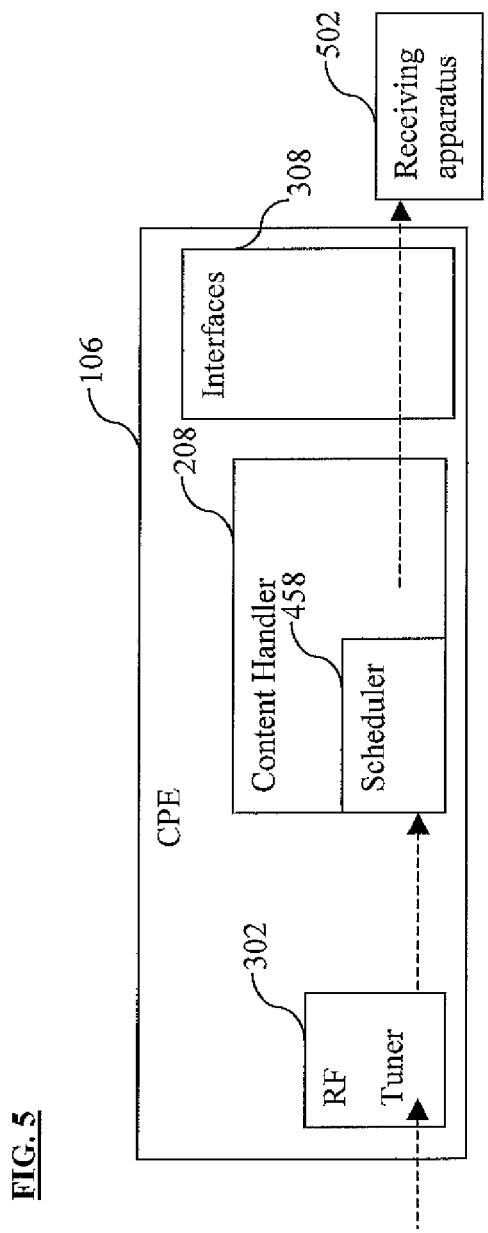
FIG. 5 is a functional block diagram of an exemplary client device implementing a content handler having a scheduler in accordance with the present invention.

Referring now to FIG. 5, a CPE 106 is shown having a content handler 208 and scheduler 458 in accordance with the present invention. As discussed above, the scheduler 458 manages the tuner 302 resource of the CPE 106, and in the exemplary embodiment, enables the content handler 208 to direct the content to a receiving apparatus 502. It is appreciated, however that several tuner resources 302 may be managed by a single scheduler 458. It is further understood that the receiving apparatus 502 of the present invention may comprise a display, storage, or other device. As will be discussed in greater detail below, the ability of the scheduler 458 to manage the tuner resources 302 is particularly advantageous in instances where a viewer would like to view or record a broadcast that will air at some future time (as discussed above). In that case, the scheduler is responsible for maintaining the request and, at the correct time, informing the content handler 208 that the content is available at the tuner.

Again the scheduler is abstracting the responsibility of scheduling recording events not only on local storage but also manages whether the recordings could be scheduled on a remote device over the home network.

Content Transfer Methodology—

The content handler 208 is adapted to communicate with the various other components within the CPE 106, as well as components within other CPEs and/or within other network entities, in order to facilitate the transfer of content between these entities. The various methods by which the content handler 208 promotes various content transfers are described in detail below.

Figure 6A:
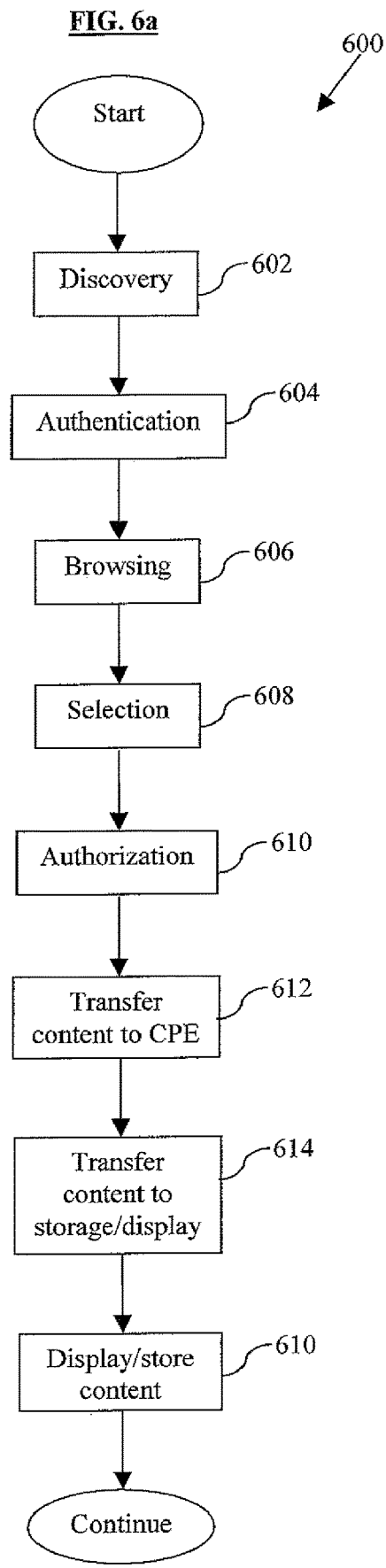
FIG. 6a is a logical flow diagram of an exemplary method of content transfer utilizing a content handler, according to the present invention, which is adapted to request stored content from a server CPE 106, a VOD sever, or a network PVR for display and/or storage.

Referring now to FIG. 6a, one exemplary embodiment of the generalized method 600 of content transfer utilizing the content handler 208 of the present invention is described. In the described embodiment, a CPE 106 having a content handler 208 functions as a renderer CPE 106b and requests stored content from a server CPE 106a or a VOD sever or a network PVR entity for display and/or storage (collectively referred to as a "server device"). The server device may or may not also advantageously comprise a content handler 208 as well.

At step 602 of the method 600, the content handler 208 of the renderer device 106b is allowed to discover the server device; or to discover the content handler 208 of the server device. The two devices thereby may form a client/server (e.g., renderer/server) relationship, although other relationships may be formed as well. This discovery 602 can occur via any number of approaches, including for example: (i) the renderer device 106b sending, through its content handler 208, a general or broadcast inquiry to all devices (and/or content handlers 208) in the network; or (ii) the server device advertising its capabilities unsolicited to the content handler 208 of the first device 106a. The server device may advertise its capabilities via its content handler 208 in one embodiment.

At step 604, the security capabilities and requirements of the renderer and server devices are checked in order to authenticate the devices. The authentication 604 may occur via a message exchange protocol, in a one-way or, alternatively, two-way authentication manner. Messages sent between the devices can be used to identify compatible security packages that each device possesses; e.g., AES or DES algorithms, public/private key pairs, support for certain security protocols, etc. Methods of authentication are well known in the communication arts and thus are not discussed further herein. In one embodiment, the method of authentication described in previously referenced U.S. patent application Ser. No. 11/592,054 is utilized consistent with the present invention.

At step 606, the renderer device 106b browses content associated with the sever device. It is noted that browsing of the server device may occur substantially through the device's content manager 208. Thus, the content handler 208 of the renderer CPE 106b comprises necessary hardware and software architecture to receive and process browsing requests by a user. The content handler 208 then communicates with the content handler 208 of the server CPE 106a, VOD server 105 or network PVR; or alternatively with another management entity disposed therein, via the aforementioned algorithms associated with the various buckets. In situations where the sever device has a content manager 208, that content manager 208 guides the browsing function in a manner similar to that of the content manager 208 of the renderer device 106b. This browsing may include review of titles, and optionally other information associated with the content (e.g., DRM or copyright requirements, file creation date, size, codec format, etc.). Such browsing functions may also allow for preview of the content by the requesting device, such as via a short pre-stored "trailer" or sample of the content, or simply accessing the content file itself for a limited duration of time. Various preview technologies known to those of ordinary skill in the art may be used consistent with the invention.

The requesting (e.g., rendering) device 106b then indicates the choice of a particular content element (e.g., movie, MP3 file, etc.) title for viewing per step 608. In one embodiment, this is accomplished via the aforementioned functionality of the renderer device's 106b content manager 208. Once this selection 608 is communicated to the server device, it determines the requesting device's 106b authorization to receive the selected content (step 610), via the requesting device's content handler 208 and, in some instances, the server's content handler 208. The authorization may not necessarily coincide with the requesting device's 106b permissions to browse or preview content.

For example, a content owner or MSO might restrict unlimited or full access to content to certain selected populations of prospective users (e.g., Time Warner Cable subscribers), whereas a larger subset of potential users can browse and preview, without having full access. This access differentiation can be used as the basis of a business model; i.e., enticing prospective subscribers or one-time purchasers by providing unlimited "teasers" or previews.

If access is allowed, then, at step 612, the selected content is formatted (if required) and then transferred over the designated communication channel from the serving device (the server CPE 106a, VOD server 105, or network PVR) to the requesting device's content handler 208. This is accomplished via placement of the content in the aforementioned buckets associated with the server device (the server CPE 106a, VOD server 105, or network PVR) on the renderer device's content handler 208. The buckets serve as reservoirs where content is placed during transfer. Thus, the management entity (content handler 208 or other) of the server CPE 106b, VOD server 105, or network PVR, accesses the requested content and transfer the content to an appropriate bucket in the content handler 208 of the renderer CPE 106b. In the instance where the CPE 106a utilizes a content handler 208 the requested content is accessed in a manner similar to that discussed below with regard to a self-search of storage.

At step 614, the content handler 208 transfers the content of the bucket associated with the sever device to the display and/or storage associated bucket of the rendering device 106b. Lastly, at step 616, the display and/or storage device is directed by the content handler 208 to display and/or store the content.

Referring now to FIG. 6b, a second exemplary embodiment of the generalized method 620 of content transfer utilizing the content handler 208 of the present invention is described. In the described embodiment, a CPE 106 having a content handler 208 is able to access content stored on the CPE 106 itself. The method 620 comprises first, at step 622, receiving a user request within the content handler 208. The user request is generally accomplished by a selection on a user's remote control, etc. Accordingly, the content handler 208 comprises the necessary hardware and software architecture to receive and process the user request. The content handler 208 may also optionally authenticate the request as being from a permissible user. Then, at step 624, the content handler 208 utilizes one of the aforementioned algorithms to access the storage device and browse the contents. Once located, appropriate content is selected (step 626); an authorization may also optionally occur, wherein the content handler 208 may authorize the specific user to retrieve the content, e.g. when the content his protected or otherwise. At step 628, the content handler 208 directs the storage device to transfer the requested content to its associated bucket. Then, at step 630, the content handler 208 transfers the requested content from the storage device bucket to a bucket associated with a display device. Finally, at step 632, the content handler 208 directs the display device to display the content.

Figure 6C:
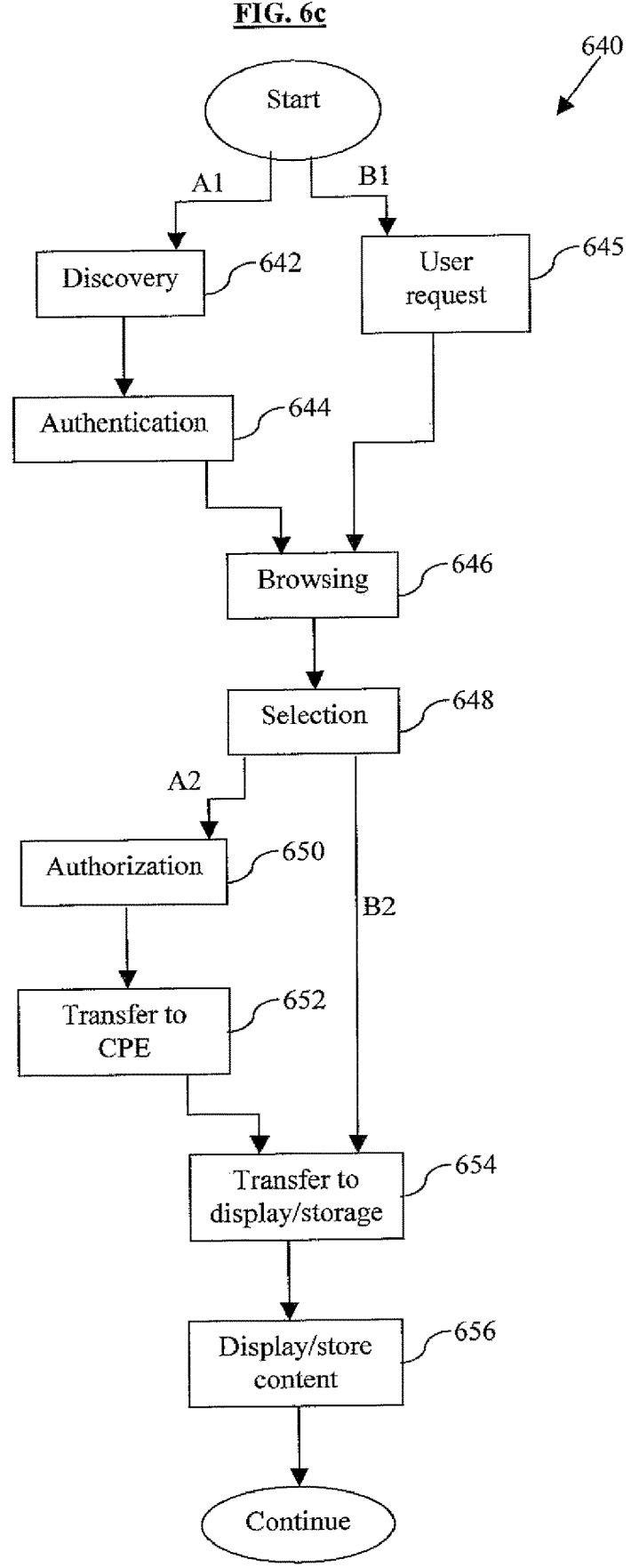
FIG. 6c is a logical flow diagram of another exemplary method of content transfer utilizing a content handler, according to the present invention, which is adapted to enable a user to view and/or record content which is presently broadcast.

Referring now to FIG. 6c, the method 640 by which the content handler 208 enables a user to view and/or record content which is presently broadcast is given.

In the instance that the request is made of an entity separate from the CPE 106 itself, such as to a separate server CPE 106a, a VOD server 105, or a network PVR entity (collectively referred to as a "server device"), pathway (A1) dictates that, first, the content handler 208 of the requesting device 106 must discover, at step 642, the server device from which content is requested. It is appreciated that the server devices may comprise their own content handlers 208, and where this is true, discovery 642 comprises discovery of the content handler 208. The discovery function 642 of the content handler(s) 208 is accomplished in a manner similar to that described above. Also as described above, the two devices may form a client/server (e.g., renderer/server) relationship, although other relationships may be formed as well. This discovery 642 can occur via any number of approaches, including for example: (i) the content handler 208 directing the requesting device 106 to advertise its capabilities unsolicited to the server device; or (ii) the server device sending a general or broadcast inquiry to all devices 106 (and/or content handlers 208) in the network. The server device may send the inquiry via their content handler(s) 208 in one embodiment. The functioning of the content handler(s) 208 is accomplished in a manner similar to that described above.

Then, per step 644, the server device authenticates the requesting device by checking the security capabilities and requirements. The authentication may occur via several mechanisms, including, inter alia, those discussed above.

In the instance where the request is made of the CPE 106 itself, pathway (B1) is followed; it indicates that, at step 645, a user request to access the scheduler 458 is received. The scheduler 458, as discussed above, manages the tuner resources 302 of the CPE 106; and, as above, the content handler 208 comprises necessary hardware and software architecture to receive and process the user request.

Pathways (A1) and (B1) converge, at step 646 where browsing of the schedule of presently broadcast programs occurs. The schedule is accessible on the CPE 106 itself and/or on the sever device. It is noted that devices having a content manager 208, including inter alia, the CPE 106 advantageously utilize a scheduler 458 entity to facilitate browsing of the schedule. Thus, the content handler 208 must comprise necessary hardware and software architecture to receive and process browsing requests by a user.

The content handler 208 communicates with the content handler 208 of the server device; or alternatively with another management entity disposed therein, via the aforementioned algorithms associated with the various buckets. In situations where the server device has a content manager 208, that content manager 208 guides the browsing function in a manner similar to that described above, including review of titles, and optionally other associated information (e.g., DRM or copyright requirements, file creation date, size, codec format, etc.). Also as discussed above, the browsing functions may additionally allow for preview of the content by the requesting device, such as via a short pre-stored "trailer" or sample of the content, or simply accessing the content file itself for a limited duration of time.

Then, at step 648, the requesting device selects a particular content element (e.g., movie, MP3 file, etc.) for viewing. In one embodiment, this is accomplished via the aforementioned functionality of the device's content manager 208.

Where the content is requested of a server device, the selection must be communicated to the device, pathway (A2) indicates that, at step 650, the request must be authorized by the server device. Authorization 650 refers to the determination of the requesting device's 106b authorization to receive the selected content via the device's 106b content handler 208 and, in some instances, the server device's content handler 208. As discussed above, the authorization 650 may not necessarily coincide with the requesting device's 106 permissions to browse or preview content, thereby giving way to one or more business models; such as enticing prospective subscribers or one-time purchasers by providing unlimited "teasers" or previews.

If access is allowed, then, at step 652, the selected content is formatted (if required) and then transferred over the designated communication channel to the requesting device's 106b content handler 208. This is accomplished via placement of the content in the aforementioned buckets associated with the server device on the requesting device's 106b content handler 208. The buckets serve as reservoirs where content is placed during transfer. Thus, the management entity (content handler 208 or other) of the server device accesses the requested content and transfers the content to an appropriate bucket in the content handler 208 of the requesting CPE 106b (step 654).

At step 654 and per pathway (B2), where the request is made of the CPE 106 itself, the content handler 208 directs the transfer of the content to a display device associated bucket and/or a storage device associated bucket (depending on the user request). Next, at step 656, the content handler 208 directs the display device to display the content, and/or the storage device to store the content.

Figure 6D:
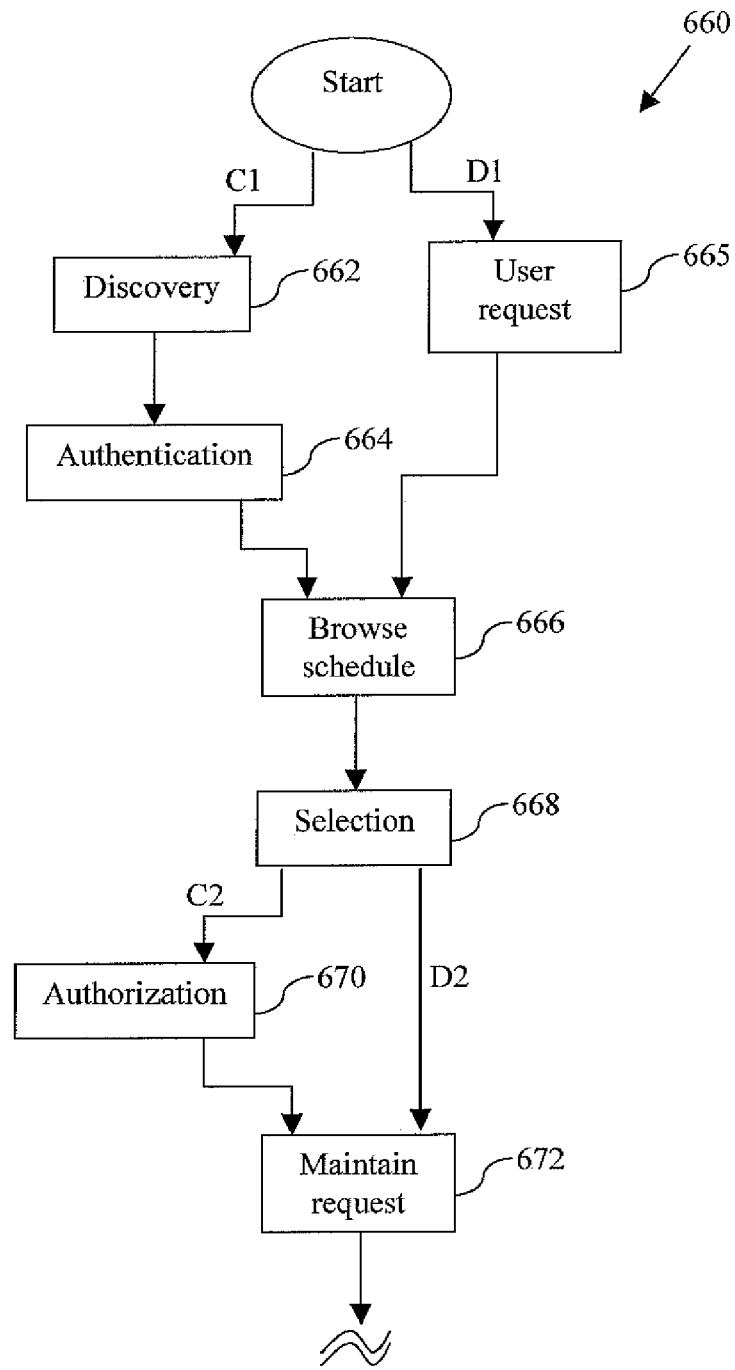
FIG. 6d is a logical flow diagram of another exemplary method of content transfer utilizing a content handler, according to the present invention, which is adapted to enable a user to view and/or record content which will broadcast at some time in the future.
Figure 6D:
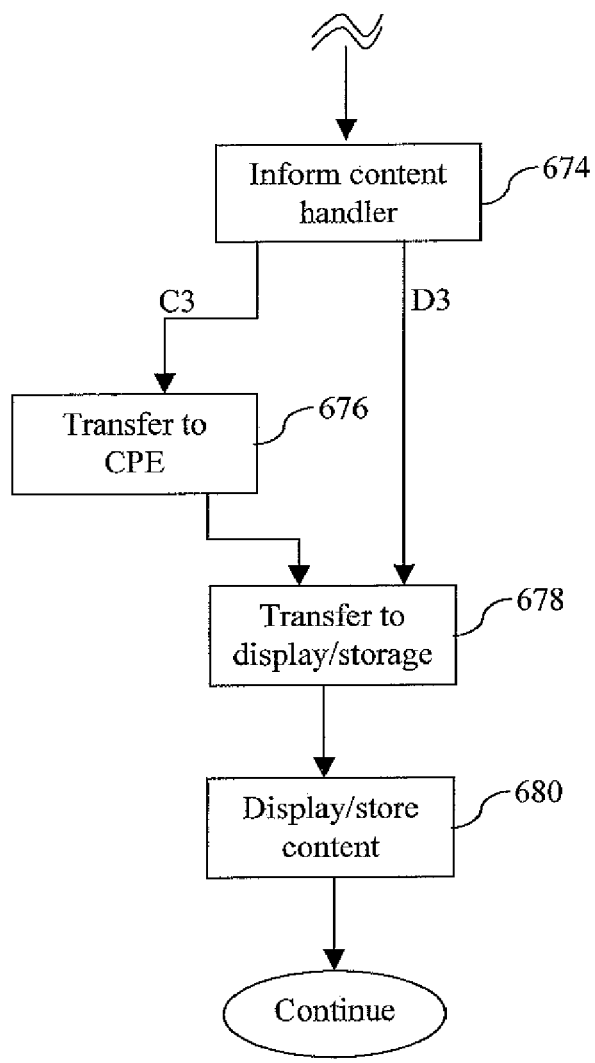

FIG. 6d illustrates the method 660 by which the content handler 208 enables a user to view and/or record content which is will broadcast at some future time.

In the instance that the request is made of an entity separate from the CPE 106 itself, such as to a separate "server" CPE 106a, a VOD server 105, or a network PVR entity (collectively referred to as a "server device"), pathway (C1) dictates that, first, the content handler 208 of the requesting device 106 must discover, at step 662, the server device from which content is requested. It is appreciated that if the server devices comprises a content handler 208, discovery 662 comprises discovery of the content handler 208. The discovery function 662 of the content handler(s) 208 is accomplished in a manner similar to that described above. Discovery 662 can occur via any of the aforementioned approaches, including for example: (i) the content handler 208 directing the requesting device 106 to advertise its capabilities unsolicited to a server device; or (ii) the server device sending a general or broadcast inquiry to all devices 106 (and/or content handlers 208) in the network (such as via a content handler 208).

Next, per step 664, the server device authenticates the requesting device 106b by checking the security capabilities and requirements. The authentication may occur via several mechanisms, including, inter alia, those discussed above.

In the instance where the request is made of the CPE 106 itself, pathway (D1) is followed; it indicates that, at step 665, a user request to access the scheduler 458 is received.

Pathways (C1) and (D1) converge, at step 666 where browsing of the schedule of future broadcast programs occurs. The schedule is accessible on the CPE 106 itself and/or on the sever device. It is noted that devices having a content manager 208, including inter alia, the CPE 106 advantageously utilizes a scheduler 458 entity to facilitate browsing of the schedule. Thus, the content handler 208 must comprise necessary hardware and software architecture to receive and process browsing requests by a user.

The content handler 208 communicates with the content handler 208 of the server device; or alternatively with another management entity disposed therein, and where the server device has a content manager 208, that content manager 208 guides the browsing function as discussed above.

Then, per step 668, the requesting device 106b selects a particular content element (e.g., movie, MP3 file, etc.) for viewing. In one embodiment, this is accomplished via the aforementioned functionality of the device's 106b content manager 208.

Where the content is requested of a server device, the selection must be communicated to the device, pathway (C2) indicates that, at step 670, the request must be authorized by the server device as discussed above.

If access is allowed, or per pathway (D2) in the instance the request is of the CPE 106 itself, the selected future content request is maintained by the scheduler 458 until the appropriate time for the content to broadcast arrives (step 672). At that time, per step 674, the content handler 208 is informed that the request is waiting and the content is available. This will be determined based at least in part on a determination of the day and time in which the content was set to broadcast (as determined by the schedule).

In the instance the content is requested from a server device, pathway (C3) indicates that at step 676, the selected content, once available, will be formatted (if required) and then transferred over the designated communication channel to the requesting device's content handler 208. This is accomplished via placement of the content in the aforementioned buckets associated with the server device on the requesting device's content handler 208. The buckets serve as reservoirs where content is placed during transfer. Thus, the management entity (content handler 208 or other) of the server CPE 106a, VOD server 105, or network PVR, accesses the requested content and transfer the content to an appropriate bucket in the content handler 208 of the requesting CPE 106b.

Next, at step 678, and, in the instance where the request is made to the CPE 106 itself, pathway (D3) indicates, the content handler 208 directs the transfer of the content to a display device associated bucket and/or a storage device associated bucket (depending on the user request). Lastly, at step 680, the content handler 208 directs the display device to display the content, and/or the storage device to store the content.

Communication and Authentication—

As discussed above, the exemplary content handler 208 is adapted to facilitate various CPE 106 communication with other network CPE 106 and devices as well as internal communication. The communication thus leads to performance of various functions including, inter alia, scanning, advertising, authentication, browsing, selection, authorization, transfer, receipt and viewing content. Accordingly, methods by which the content handler 208 facilitates the data exchange between the entities may include a message exchange mechanism such as that previously referenced herein. The aforementioned communication may occur via a UPnP service such as that disclosed in co-owned U.S. patent application Ser. No. 11/592,054 entitled "Methods and apparatus for premises content distribution" and issued as U.S. Pat. No. 8,732,854 on May 20, 2014, incorporated herein by reference in its entirety.

Contention Issues—

Contention is a condition that arises when two or more data attempts occur at the same time. The present invention contemplates that when these conflicts arise, the content handler 208 notifies the user. The user resolves contention issues by choosing one of the data to be displayed and/or stored; and the user's selection is understood and carried out by the content handler 208.

Figure 7A:
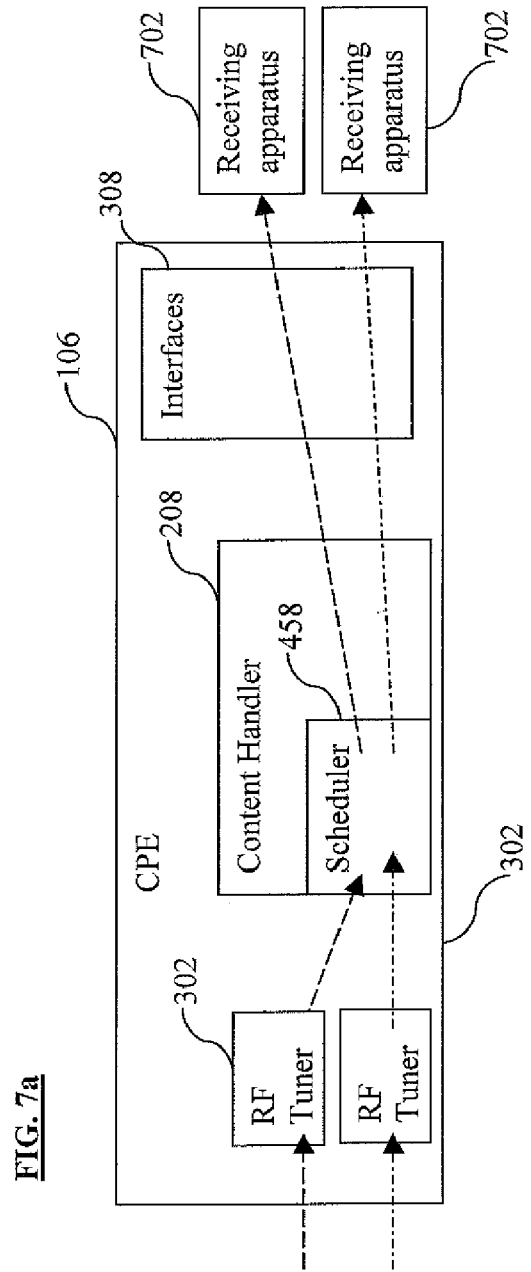
FIG. 7a is a functional block diagram of another exemplary embodiment of a client device having a content handler and a scheduler in accordance with the present invention.

FIG. 7a illustrates another embodiment of a CPE 106 having a content handler 208 and a scheduler 458 in accordance with the present invention. As indicated above, the scheduler 458 is utilized to manage the tuner resources. In the illustrated embodiment, the CPE 106 advantageously comprises two tuners. However, it is appreciated that more may be utilized consistent with the present invention. Specifically, having two tuners 302 enables the CPE 106 to receive content from two separate RF channels simultaneously; the scheduler 458 enables the content handler 208 to direct the transfer of the content received from the two data streams for display and/or storage to two separate receiving devices simultaneously.

Figure 7B:
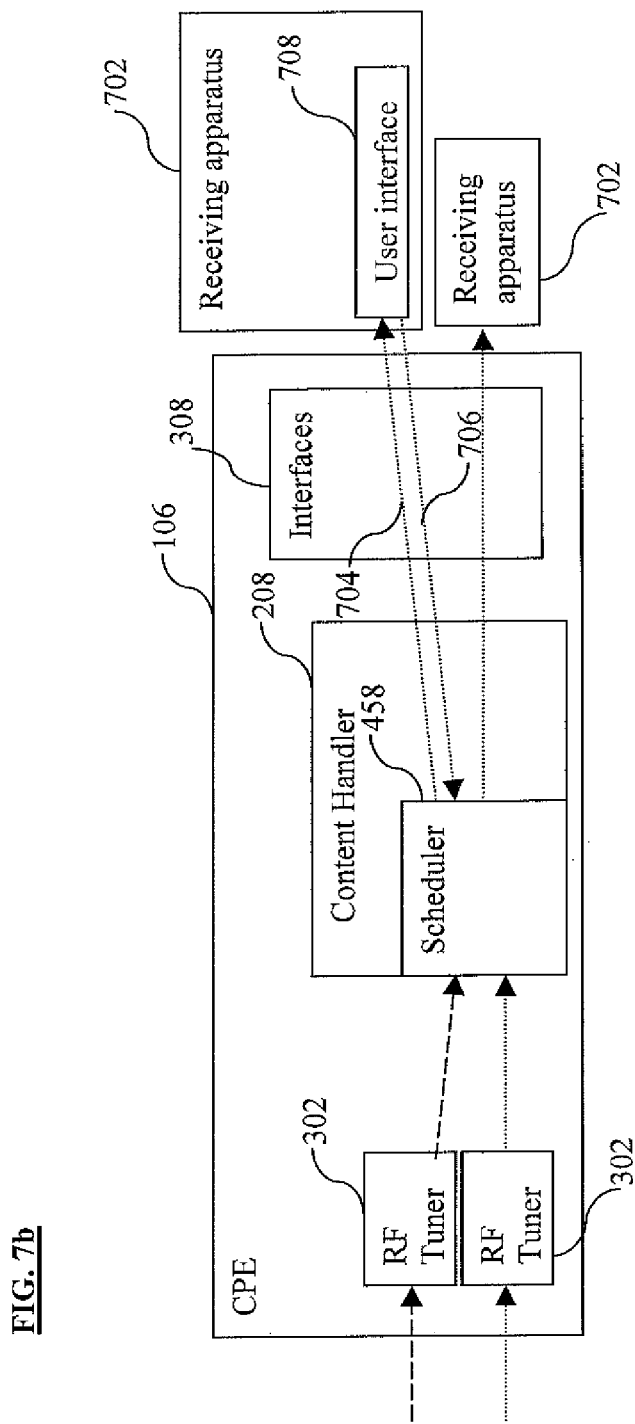
FIG. 7b is a functional block diagram of the exemplary client device of FIG. 7a utilizing a scheduler to resolve contention issues.

FIG. 7*b* illustrates the instance where one or more of the tuners is faced with a contention issue, such as where a user has requested to receive one content stream and there exists a pre-set request for a separate content stream in the scheduler 458 which would be implemented at the same time. It is also appreciated that contention issues may arise for alternate reasons or where more than two program streams are in contention; the scheduler 458 of the present invention is adapted to rectify these situations as well.

When a contention issue arises, the scheduler 458 identifies the tuner 302 with a contention issue and retrieves identification data about the program streams. The scheduler then notifies the user via the user interface 708 by sending a message 704 including identifying information about the contending program streams. The identifying information may advantageously comprise, inter alia, the title, running time, summary, or other details about the program stream content which will give the user adequate information to enable him/her to select which of the contending streams he/she would like to display or store. The user's selection will then be transmitted to the scheduler 458 via message 706 also containing identifying information at least for the selected program stream. The response message 706 is recognized and processed by the scheduler 458. Accordingly, the scheduler 458 enables the content handler 208 to direct the transfer of the selected content to the appropriate receiving device 602.

In another embodiment (not shown) it is further appreciated that when a contention issue arises, the scheduler 458 may be adapted to resolve the issue itself, according to pre-set rules, and not notify the user. Alternatively, the scheduler 458 may default to pre-set rules only if there is no response from the user after a set period of time. The pre-set rules will utilize the identifying information about the content stream that was previously gathered, at least in part, to facilitate the computer's selection. For example, the identifying information may comprise priority information including the date/time the program stream was selected for delivery. In one embodiment, program streams that were selected earlier may, according to the pre-set rules, be selected over newly selected streams. Alternatively, the rules may indicate that newly selected program streams be favored. In another example, the identifying information may comprise historical information about the frequency with which that particular content stream is requested by the CPE 106. Accordingly, the scheduler 458 chooses program streams which the user often requests over those that are less familiar. It is appreciated that other identifying information may be utilized with various pre-set rules to implement various selection criteria for the CPE 106, the above being merely exemplary.

A method 720 of resolving contention issues is given by FIG. 7*c*. As illustrated and discussed above, the method 720 comprises first, at step 722, identifying the tuner having a contention issue. At step 724, information regarding the program streams in contention is retrieved. As discussed above, the information retrieved may comprise, inter alia, details regarding the content associated with the program stream, priority information and/or historical information. In one embodiment, pathway E, the user is notified at step 726 and requested to make a selection. The notification will comprise at least permitting the user to view the retrieved information. In the instance where the user makes a selection, that information will be transmitted at step 730 via pathway F to a processing function of the content handler 208; however, if the user does not make a selection after a given period of time, via pathway G, the scheduler 458 is directed to select (step 728) and that selection will be transmitted at step 730 to the content handler 208. The selection by the scheduler 458 will be based at least in part on the retrieved information. In a second embodiment, pathway H, the user is not notified and instead, the scheduler 458 is adapted to select one of the contenting program streams (step 728). Selection by the scheduler 458 is accomplished via the aforementioned rules within the scheduler 458, and, at step 730 the scheduler's 458 selection is transmitted to a processing function of the content handler 208. Finally, at step 732, the content handler 208 will direct the transfer of the selected content to a receiving apparatus 702 for storage and/or display.

Software Architecture—

In another aspect of the invention, software adapted to enable a CPE 106 to further comprise a content handler 208 is given. The software described is advantageously adapted to permit the CPE 106 on which it is run to process requests for content, direct browsing of available content and direct a transfer of the requested content to a receiving apparatus 702. The receiving apparatus 702 may include, inter alia, a display device, a storage device, etc.

As noted above, the content handler 208 may be run on and adapted to manage content within only one device 106. Further, the content handler 208 is also adapted to run on one device 106 yet manage content transfer between the device 106 it is run on and a second device 106 which may or may not also comprise a content handler 208.

In one instance, the content handler 208 is adapted to receive requests from the device 106 on which it is being run and direct the browsing of a storage device attached thereto. It is noted that the storage device may comprise an internal storage device and/or may comprise storage devices external to the CPE 106 having the content handler 208. Accordingly, a user is permitted, via a content handler 208, to request to view stored content, browse the content and select content for display. The content handler 208 is adapted direct the above functions. The content handler 208 may also direct the search and display of content presently available to the device 106 via a network connection, including inter alia, an RF tuner, a wideband tuner, more than one RF tuner. The content handler 208 software may be further adapted to include scheduler 458 functionality. Accordingly, the scheduler 458 of the content handler 208 enables a user to browse content which will be available at a future time and set the CPE 106 to record and/or display that future content.

In a second instance, the content handler 208 is run on a server device 106*a* and requests are received from a separate, requesting device 106*b*. Accordingly, the user of the requesting device 106*b* requests to search the storage of the server device 106*a*. As discussed above, the request may be generated by the requesting device's 106*b* content handler 208. The request is received by the server device 106 as content handler 208, and processed. The content handler 208 also directs the search or browsing and once a selection is made, directs the transfer of content to the requesting device 106*b*. Accordingly, a user is permitted, via a content handler 208 on the server device 106*a*, to request to view stored content, browse the content and select content for display and/or storage. The content handler 208 software of the server device 106a may be further adapted to include scheduler 458 functionality. As discussed above, the scheduler 458 of the content handler 208 enables the user of the requesting device 106b to browse content which will be available at a future time to the server device 106a and set the server device 106a to record and/or transfer that future content to the requesting device 106b for storage and/or display when the future content becomes available.

In another instance, the content handler 208 is run on a requesting device 106b and requests are made to a separate server device 106a. Accordingly, the user of the requesting device 106b requests to search the storage of the server device 106a. As discussed above, the request may be processed and managed by the server device's 106a content handler 208. Once the content is received, the content handler 208 directs the transfer of content to the receiving apparatus 702. The content handler 208 software of the requesting device 106b may be further adapted to include scheduler 458 functionality. As discussed above, the scheduler 458 of the content handler 208 enables the user of the requesting device 106b to browse content which will be available at a future time to the server device 106a and set the server device 106a to record and/or transfer that future content to the requesting device 106b for storage and/or display when the future content becomes available.

Network Server Architecture—

It will be appreciated that, in another embodiment, various CPE 106 in a network may communicate with one overarching network server (not shown) having a content handler 208 consistent with the present invention. According to this embodiment, the various CPE 106 both inside and outside of a particular user/subscriber's premises may be permitted to browse, request, and receive content stored on the network server. It is further appreciated that the network CPE 106 may, in another embodiment, be permitted to browse, request and receive content on other CPE 106 on the network via the network server entity as well.

Business Methods and Operational "Rules" Engine—

In another aspect of the invention, an operational or business "rules" engine can be implemented consistent with the invention as a higher layer or supervisory process that imposes particular rules on the previously described server and client processes in order to produce desired business or operations goals. The rules engine can be considered an overlay of sorts to the more fundamental processes used to accomplish required device advertising/discovery, security package negotiation, browsing, etc.

In one embodiment, this rules engine is implemented a computer programs or programs running on one or more of the CPE 106 that are party to a renderer-server transaction. As previously discussed, the server CPE 106a, renderer CPE 106b, VOD server 105 and/or PVR entity can implement logic to exchange messages and negotiate a common security framework that can be used for communication. This allows for mixing and matching of different vendor's equipment and overcomes the "single source" economic inefficiency introduced by proprietary conditional access and DRM solutions. The selection and utilization of the particular aspect of this common security framework, as well as other features such as the communication channels that may be used to effectuate scanning, authentication, browsing, and content transfer, may be governed by the higher layer "rules" processes as well.

The supervisory rules may comprise a separate entity or process which is substantially autonomous of the network operator, and may be fully integrated within other processing entities (such as the aforementioned content handler 208). Alternatively, the rules engine may be controlled via e.g., a remote MSO user interface 708 such as a GUI on a PC connected to the relevant device via a network interface, so as to allow the MSO to adjust or reprogram aspects of the rules engine, reload it with updates, etc.

Included within these rules are the implementation of security management policies that can increase or enhance: (i) content security or protection, (ii) network optimization and reliability, (iii) subscriber or user satisfaction, (iv) profit or revenue, and so forth.

For example, one rule implemented by the rules engine may comprise only providing certain types or program recording and/or distribution features to certain subscribers or classes of subscribers. The subscriber server CPE 106a, VOD server 105, and/or PVR entity may possess UPnP capability for interfacing with and transmitting content to a connected device for example, but the ability to transfer such protected content out of the server entity (CPE 106a, VOD server 105, and/or PVR entity) not be made available to such subscribers unless they met certain criteria (e.g., "premium" subscription, etc.).

Moreover, premium subscribers might be given a greater scope of options and choices; e.g., the ability to use a wider range of CPE (e.g., new DSTBs introduced in the retail market), while more basic subscribers are limited as to the type of device they may use as part of their subscription.

The present invention also contemplates the partial disclosure of content by a server CPE based on the level of authentication achieved by a renderer device. These levels of authentication may be controlled by the network operator, such as where higher levels of access or authentication are provided to subscribers or users with greater privileges. For example, when a renderer is not authenticated at all, the server entity (CPE 106a, VOD server 105, and/or PVR entity) may be configured to not give the requesting CPE any access to browsing protected material of any kind. At a higher tier of authentication or permission, the server may give access to the renderer to only a subset of titles, or alternatively all titles, but without access to the substantive content itself (other than perhaps a trailer or preview).

Similarly, a server entity may be configured by the rules engine to only provide access to content that originated from a cable WAN (e.g., HFC 101) for requesting devices that authenticate themselves as a "cable operator authorized renderer", or provide some other indicia of trust for that particular type or origin of content.

Further, different rules or grades of access can be provided to different types of content; e.g., content that is more mature or has been in distribution for a longer period of time may be viewed as less risky from a theft or unauthorized copying standpoint, and hence the authentication level or permissions required to browse and even transfer that content may be relaxed somewhat as compared to new release content.

The server entity (CPE 106a, VOD server 105, and/or PVR entity) may also segregate content (based, e.g., on AssetContentID or a similar variable) and apply different access and transfer rules based on such segregation. For example, all content with an AssetContentID of a certain form might require extended permissions (e.g., parental control) and authentication before that content can be previewed or transferred.

The server may also be advantageously used as an advertisement platform to provide occasional browsing access to showcased content to attract a user to purchase additional titles, or a subscription or membership.

The business rules engine previously described, or another functional entity within the network, may also be used to implement and enforce so-called "copy once" rules or protection mechanisms of the type well known in the content reproduction and distribution arts. Similar rules such as e.g., "never copy" and "no more copying" can also be implemented as desired. For example, the Philips Video Content Protection System (VCPS), which enables content delivered over a cable network to be marked as "copy once", meaning it can be burned onto VCPS-enabled DVD+R and DVD-RW disks, although many other types of systems and rules are envisaged for use within the current invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A first computerized user device configured for data communication with a second computerized user device over an ad hoc network, the first computerized user device further configured for role-switching between a server device role and a renderer device role, the first computerized user device comprising:
   a data communication interface configured for data communication with at least the second computerized user device via the ad hoc network;
   data storage apparatus; and
   processor apparatus configured for data communication with each of the data communication interface and the data storage apparatus, the data storage apparatus having at least one computer program stored thereon, the at least one computer program comprising a plurality of instructions which are configured to, when executed by the processor apparatus:
      cause the first computerized user device to receive data indicative of a first user request to access content, the first user request comprising a request to access, via the first computerized user device, first digital content available at the second computerized user device;
      based at least on the data indicative of the first user request, cause the first computerized user device to assume the renderer device role;
      receive data indicative of a second user request to access content, the second user request comprising a request to access, via the second computerized user device, second digital content available at the first computerized user device; and
      based at least on the data indicative of the second user request, cause the first computerized user device to assume the server device role.

2. The first computerized user device of claim 1, wherein the plurality of instructions are further configured to, when executed by the processor apparatus, cause the first computerized user device to establish an ad hoc communication channel between the first computerized user device and the second computerized user device.

3. The first computerized user device of claim 1, wherein the role-switching comprises utilization of a wireless air interface protocol, the wireless air interface protocol configured to cause switch from a first role specified by the wireless air interface protocol, to a second, different role specified by the wireless air interface protocol.

4. The first computerized user device of claim 3, further comprising:
   a first software process configured to manage the role-switching; and
   a second software process configured to manage the data communication interface;
   wherein the utilization of the wireless air interface protocol for the role-switching is conducted via data communication between the first software process and the second software process.

5. The first computerized user device of claim 1, wherein the plurality of instructions are further configured to, when executed by the processor apparatus, cause the first computerized user device to enable the second computerized user device to establish an ad hoc communication channel between the first computerized user device and the second computerized user device.

6. The first computerized user device of claim 1, wherein the causation of the first computerized user device to assume the renderer device role at least in part comprises:
   causation of the first computerized user device to access a schedule of content available at the second computerized user device;
   receipt, at the first computerized user device, of data indicative of a user selection of the first digital content, the data indicative of the user selection generated by a user input device associated with the first computerized user device; and
   receipt of at least a portion of the first digital content at the first computerized user device from the second computerized user device, the at least portion of the first digital content transmitted based at least in part on the data indicative of the user selection.

7. The first computerized user device of claim 6, wherein:
   the access of the schedule of content available at the second computerized user device comprises access of a schedule of content available at the second computerized user device at a future time; and
   the causation of the first computerized user device to assume the renderer device role further comprises:
      enablement of automatic reservation of one or more media storage resources of the second computerized user device for recording of the first digital content; and
      enablement of automatic recordation of the first digital content by the second computerized user device at the future time.

8. The first computerized user device of claim 1, wherein the causation of the first computerized user device to assume the server device role at least in part comprises:

enablement of the second computerized user device to access a schedule of content available at the first computerized user device;
receipt, at the first computerized user device from the second computerized user device, of data indicative a user selection of the second digital content; and
causation of transmission of at least a portion of the second digital content from the first computerized user device to the second computerized user device, the causation of the transmission based at least in part on the data indicative of the user selection.

9. The first computerized user device of claim 8, wherein:
the access of the schedule of content available at the first computerized user device comprises access of a schedule of content available at the first computerized user device at a future time; and
the causation of the first computerized user device to assume the server device role further comprises:
causation of automatic reservation of one or more media storage resources of the first computerized user device for recordation of the second digital content; and
causation of automatic recordation of the second digital content by the first computerized user device at the future time.

10. Computerized apparatus configured for data communication with a plurality of computerized entities over a local area communication network, the computerized apparatus comprising:
a first data communication interface configured for data communication with at least one of the plurality of computerized entities via the local area communication network;
a second data communication interface configured for data communication with at least a content delivery network;
data storage apparatus; and
processor apparatus configured for data communication with each of the first data communication interface, the second data communication interface, and the data storage apparatus, the data storage apparatus having at least one computer program stored thereon, the at least one computer program comprising a plurality of instructions which are configured to, when executed by the processor apparatus, cause the computerized apparatus to:
establish an ad hoc communication channel between the computerized apparatus and the plurality of computerized entities via at least the local area communication network;
receive data representative of a first user request to access, via at least the computerized apparatus, first digital content stored at a first one of the plurality of computerized entities;
based at least in part on the data representative of the first user request, enable a rendering functionality at the computerized apparatus;
receive at least a portion of the first digital content from the first one of the plurality of computerized entities, the at least portion of the first digital content transmitted based at least in part on the data representative of the first user request;
receive data representative of a second user request to access, via at least one of the first one or a second one of the plurality of computerized entities, second digital content stored at the computerized apparatus; and
based at least in part on the receipt of the data representative of the second user request:
enable a server functionality at the computerized apparatus; and
enable the at least one of the first one or the second one of the plurality of computerized entities to access the second digital content.

11. The computerized apparatus of claim 10, wherein the local area communication network comprises a Wi-Fi network, the Wi-Fi network comprising at least a Wi-Fi access point (AP) device and a Wi-Fi station (STA) device; and
wherein the computerized apparatus functions as the Wi-Fi AP device, and the plurality of computerized entities function as Wi-Fi STA devices.

12. The computerized apparatus of claim 11, wherein the plurality of instructions are further configured to, when executed by the processor apparatus, cause the computerized apparatus to switch to assume a Wi-Fi STA functionality while at least one of the rendering functionality or the server functionality is/are maintained.

13. The computerized apparatus of claim 10, wherein the local area communication network comprises a Bluetooth network, the Bluetooth network comprising at least a master device and a slave device; and
wherein the computerized apparatus functions as the master device, and the at least one of the first one or the second one of the plurality of computerized entities functions as the slave device.

14. The computerized apparatus of claim 13, wherein the plurality of instructions are further configured to, when executed by the processor apparatus, cause the computerized apparatus to switch to assume a Bluetooth slave device functionality while at least one of the rendering functionality or the server functionality is/are maintained.

15. The computerized apparatus of claim 10, wherein the plurality of instructions are further configured to, when executed by the processor apparatus, cause the computerized apparatus to provide a gateway service for the plurality of computerized entities to perform at least one of (i) connection to the content delivery network, or (ii) search for additional content available via the local area communication network.

16. A computerized method for establishing data communication between at least a first computerized client device and a second computerized client device over an ad hoc network, the first computerized client device configured for role-switching between a server device role and a renderer device role, the computerized method comprising:
receiving data representative of a first request to access, via the first computerized client device, first digital content available at the second computerized client device;
based at least on the data representative of the first request, causing the first computerized client device to assume the renderer device role;
receiving data indicative of a second request to access, via the second computerized client device, second digital content available at the first computerized client device; and
based at least on the data representative of the second request, causing the first computerized client device to assume the server device role.

17. The computerized method of claim 16, further comprising causing establishment of an ad hoc communication channel between the first computerized client device and the second computerized client device.

18. The computerized method of claim 16, wherein the role-switching comprises utilizing a wireless air interface protocol, the wireless air interface protocol configured to cause switch from a first role specified by the wireless air interface protocol, to a second, different role specified by the wireless air interface protocol.

19. The computerized method of claim 16, wherein the causing the first computerized client device to assume the renderer device role comprises:
   causing the first computerized client device to access a schedule of content available at the second computerized client device;
   receiving data representative of a user selection of the first digital content, the data representative of the user selection generated by a user input device associated with the first computerized client device; and
   causing receipt of at least a portion of the first digital content at the first computerized client device from the second computerized client device, the at least portion of the first digital content transmitted based at least in part on the data indicative of the user selection.

20. The computerized method of claim 19, wherein:
the causing the first computerized client device to access the schedule of the content available at the second computerized client device comprises causing the first computerized client device to access of the schedule of the content available at the second computerized client device at a future time; and
the causing the first computerized client device to assume the renderer device role further comprises:
   enabling automatic reservation of one or more media storage resources of the second computerized client device for recording the first digital content; and
   enabling automatic recordation of the first digital content by the second computerized client device at the future time.

* * * * *